US012252171B2

(12) United States Patent
Noguchi et al.

(10) Patent No.: US 12,252,171 B2
(45) Date of Patent: Mar. 18, 2025

(54) INFORMATION TERMINAL, CONTROL METHOD, AND COMPUTER-READABLE RECORDING MEDIUM

(71) Applicant: HONDA MOTOR CO., LTD., Tokyo (JP)

(72) Inventors: Jumpei Noguchi, Tokyo (JP); Gaku Shimamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 18/110,124

(22) Filed: Feb. 15, 2023

(65) Prior Publication Data

US 2023/0303168 A1 Sep. 28, 2023

(30) Foreign Application Priority Data

Mar. 22, 2022 (JP) ................................ 2022-045651

(51) Int. Cl.
*B62D 15/02* (2006.01)
*B60W 30/06* (2006.01)
(Continued)

(52) U.S. Cl.
CPC ......... *B62D 15/0275* (2013.01); *B60W 30/06* (2013.01); *B62D 15/0285* (2013.01);
(Continued)

(58) Field of Classification Search
CPC ........... B62D 15/0275; B62D 15/0285; B60W 30/06; G05D 1/0016; G05D 1/00;
(Continued)

(56) References Cited

U.S. PATENT DOCUMENTS 10,831,187 B2 * 11/2020 Bourassi ............... B60W 50/14
11,148,661 B2 * 10/2021 Golgiri .................. B60Q 1/503
(Continued)

FOREIGN PATENT DOCUMENTS

CN 110007791 A 7/2019
JP 2012-215945 A 11/2012
(Continued)

OTHER PUBLICATIONS

WO-2019163165-A1 machine translation (Year: 2019).*
(Continued)

*Primary Examiner* — Angelina M Shudy
(74) *Attorney, Agent, or Firm* — Paratus Law Group, PLLC

(57) ABSTRACT

A portable information terminal for a user of a moving object includes: a display configured to perform a position instruction operation on a display image, and a controller configured to perform movement control of the moving object based on a specific operation from the user on the display. The controller is configured to cause the display to display a guidance image that prompts the specific operation when waiting for receiving the specific operation, store position information of the specific operation performed by the user based on the guidance image, and display the guidance image that prompts the specific operation based on the position information on the display in a case of storing the position information when waiting for receiving the specific operation.

5 Claims, 26 Drawing Sheets

(51) Int. Cl.
*G05D 1/00* (2006.01)
*G06F 3/04845* (2022.01)
*G06F 3/0488* (2022.01)

(52) U.S. Cl.
CPC ....... *G05D 1/0016* (2013.01); *G06F 3/04845* (2013.01); *G06F 3/0488* (2013.01)

(58) Field of Classification Search
CPC ............... G06F 3/04845; G06F 3/0488; G06F 3/04847; G06F 3/04883; H04M 1/72415
See application file for complete search history.

(56) References Cited

U.S. PATENT DOCUMENTS

| | | | | |
|---|---|---|---|---|
| 11,372,401 | B2 * | 6/2022 | Noguchi | G05D 1/0055 |
| 11,480,957 | B2 * | 10/2022 | Shimamoto | B62D 15/0285 |
| 11,535,243 | B2 * | 12/2022 | Shimamoto | B62D 15/0285 |
| 11,681,286 | B2 * | 6/2023 | Sannodo | B62D 1/00 701/2 |
| 11,693,398 | B2 * | 7/2023 | Bettger | B60W 30/06 701/2 |
| 11,953,898 | B2 * | 4/2024 | Nakashima | B60K 35/85 |
| 2009/0241072 | A1 * | 9/2009 | Chaudhri | H04M 1/663 715/863 |
| 2010/0045623 | A1 * | 2/2010 | Sakurai | G06F 3/0488 345/173 |
| 2010/0083167 | A1 * | 4/2010 | Kikuchi | G06F 1/1624 715/863 |
| 2013/0283144 | A1 * | 10/2013 | Roh | G06F 40/169 715/230 |
| 2014/0111454 | A1 * | 4/2014 | Hosoi | G06F 3/04883 345/173 |
| 2014/0121883 | A1 * | 5/2014 | Shen | B62D 15/0285 701/28 |
| 2015/0168174 | A1 * | 6/2015 | Abramson | G01C 21/3484 701/408 |
| 2015/0285645 | A1 * | 10/2015 | Maise | G08G 1/205 701/25 |
| 2015/0375741 | A1 * | 12/2015 | Kiriya | G06V 40/28 701/2 |
| 2016/0070412 | A1 | 3/2016 | Shimazu et al. | |
| 2016/0162146 | A1 * | 6/2016 | Wu | G06F 3/0488 715/776 |
| 2016/0170494 | A1 * | 6/2016 | Bonnet | B60K 35/60 345/173 |
| 2016/0266778 | A1 * | 9/2016 | Rawlinson | B60K 35/50 |
| 2017/0060391 | A1 * | 3/2017 | Jun | G06F 3/0482 |
| 2017/0234691 | A1 * | 8/2017 | Abramson | G01C 21/3626 701/442 |
| 2018/0292977 | A1 * | 10/2018 | Pinder | G06F 3/04842 |
| 2018/0302786 | A1 * | 10/2018 | Yu | G06F 21/316 |
| 2018/0364697 | A1 * | 12/2018 | Elangovan | G05D 1/0016 |
| 2019/0018404 | A1 * | 1/2019 | Bourassi | B60W 30/06 |
| 2019/0080076 | A1 * | 3/2019 | Remele | G06F 21/83 |
| 2019/0146628 | A1 * | 5/2019 | Ohya | G06F 3/04842 345/173 |
| 2019/0310624 | A1 * | 10/2019 | Bettger | B62D 15/0285 |
| 2020/0041992 | A1 * | 2/2020 | Nagashima | G06F 3/04847 |
| 2020/0218249 | A1 * | 7/2020 | Sannodo | B62D 1/00 |
| 2020/0311623 | A1 * | 10/2020 | Noguchi | G07B 15/02 |
| 2021/0086762 | A1 * | 3/2021 | Shimamoto | G08G 1/144 |
| 2021/0089019 | A1 * | 3/2021 | Shimamoto | G01S 3/023 |
| 2021/0089020 | A1 * | 3/2021 | Shimamoto | G01C 21/3605 |
| 2021/0089021 | A1 * | 3/2021 | Shimamoto | B62D 1/00 |
| 2021/0216067 | A1 * | 7/2021 | Noguchi | G06F 3/04186 |
| 2021/0216202 | A1 * | 7/2021 | Noguchi | B60K 35/29 |
| 2022/0342415 | A1 * | 10/2022 | Suzuki | G06F 3/04883 |
| 2022/0365527 | A1 * | 11/2022 | Suzuki | B60W 30/06 |
| 2022/0382275 | A1 * | 12/2022 | Martin | G05D 1/0016 |
| 2023/0174081 | A1 * | 6/2023 | Shimomura | B62D 15/0285 701/29.2 |
| 2023/0236592 | A1 * | 7/2023 | Noguchi | G05D 1/0011 701/24 |
| 2023/0236596 | A1 * | 7/2023 | Noguchi | G05D 1/0038 701/2 |
| 2023/0278575 | A1 * | 9/2023 | Shimamoto | B60W 30/06 701/23 |
| 2023/0339498 | A1 * | 10/2023 | Noguchi | B60W 30/06 |
| 2024/0078847 | A1 * | 3/2024 | Gudivada | G06V 40/67 |
| 2024/0217507 | A1 * | 7/2024 | Yasuda | B60W 10/26 |
| 2024/0227733 | A1 * | 7/2024 | Matsushita | H04L 9/08 |

FOREIGN PATENT DOCUMENTS

| | | | |
|---|---|---|---|
| JP | 2013-161332 | A | 8/2013 |
| JP | 2014-228989 | A | 12/2014 |
| JP | 2018-101226 | A | 6/2018 |
| JP | 2019-514088 | A | 5/2019 |
| JP | 2021-109530 | A | 8/2021 |
| WO | WO 2019/065699 | A1 | 4/2019 |
| WO | WO-2019163165 | A1 * | 8/2019 |

OTHER PUBLICATIONS

Nov. 21, 2023, translation of Japanese Office Action issued for related JP Application No. 2022-045651.

Oct. 15, 2024, translation of Chinee Office Action issued for related CN Application No. 202310181937.2.

* cited by examiner

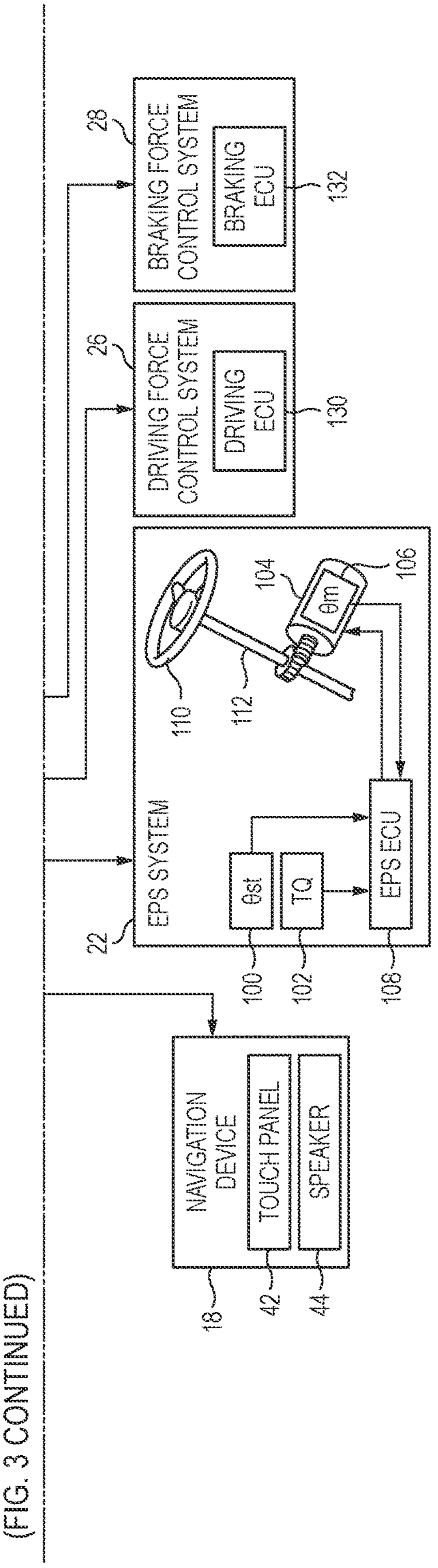
(FIG. 3 CONTINUED)

(CONT.)

(FIG. 6 CONTINUED)
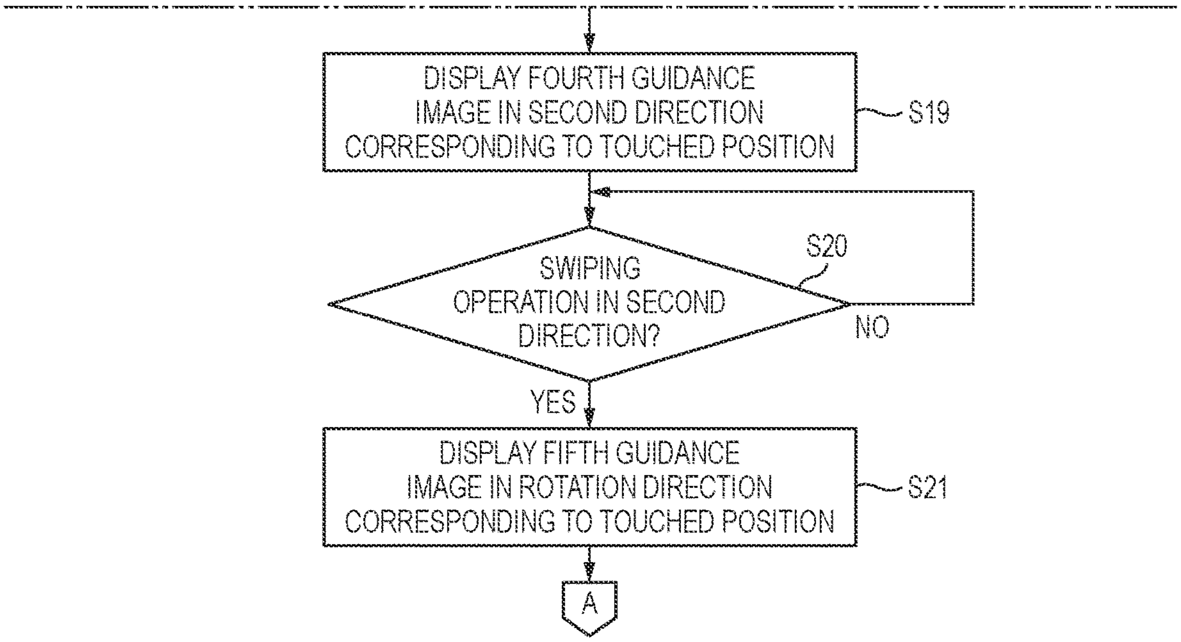

INFORMATION TERMINAL, CONTROL METHOD, AND COMPUTER-READABLE RECORDING MEDIUM

CROSS-REFERENCE TO RELATED APPLICATIONS

This application is based on and claims priority under 35 USC 119 from Japanese Patent Application No. 2022-045651 filed on Mar. 22, 2022, the contents of which are incorporated herein by reference.

TECHNICAL FIELD

The present invention relates to an information terminal, a control method, and a computer-readable recording medium.

BACKGROUND

In recent years, efforts have been made to provide access to sustainable transport systems that are considerate of vulnerable people among transport participants. In order to realize the above object, attention is focused on research and development to further improve safety and convenience of traffic through research and development related to automated driving.

In the related art, a remote-parking system has been developed to remotely controls a vehicle by using a smartphone to park the vehicle in a designated predetermined parking space or to cause the vehicle to exit from the parking space. International Publication No. 2019/163165 Pamphlet (hereinafter, referred to as Patent Literature 1) discloses a portable device in which when a user uses the portable device to park a vehicle in a parking space by remote operation, guidance information such as a message or a pattern for the remote operation is displayed on a screen.

Japanese Patent Application Laid-Open Publication No. 2019-514088 (hereinafter, referred to as Patent Literature 2) discloses a manoeuvre system of a portable device in which when a user operates a screen of the portable device, guidance information such as arrows and circles are displayed on the screen to prompt the user to operate an area opposite to an area where a communication antenna of the portable device is arranged.

According to the portable device of Patent Literature 1, by operating the portable device according to the guidance information, the vehicle can be parked in the parking space. According to the manoeuvre system of Patent Literature 2, by operating the area where the guidance information is displayed, a communication quality between the antenna of the portable device and an automated vehicle can be ensured. However, a manner of operation of each user when operating the screen of the portable device is not always the same, and each user has certain operational characteristics. Therefore, some users may feel burdened with the manner of the operation on the screens shown in Patent Literature 1 and Patent Literature 2. Therefore, in the automated driving, there is room for improvement regarding ease of operation of a screen of a portable device.

The present disclosure provides an information terminal, a control method, and a computer-readable recording medium storing a control program that can improve operability when performing movement control. Further, the present invention contributes to development of sustainable transport systems.

SUMMARY

A first aspect of the present disclosure relates to a portable information terminal for a user of a moving object, the information terminal including:

- a display configured to perform a position instruction operation on a display image; and
- a controller configured to perform movement control of the moving object based on a specific operation from the user on the display, in which
- the controller is configured to
  - cause the display to display a guidance image that prompts the specific operation when waiting for receiving the specific operation,
  - store position information of the specific operation performed by the user based on the guidance image, and
  - display the guidance image that prompts the specific operation based on the position information on the display in a case of storing the position information when waiting for receiving the specific operation.

A second aspect of the present disclosure relates to a control method performed by a controller of a portable information terminal for a user of a moving object, in which

- the information terminal includes a display configured to perform a position instruction operation on a display image the controller configured to perform movement control of the moving object based on a specific operation from the user on the display, and
- the control method includes:
  - causing the display to display a guidance image that prompts the specific operation when waiting for receiving the specific operation,
  - storing position information of the specific operation performed by the user based on the guidance image, and
  - displaying the guidance image that prompts the specific operation based on the position information on the display in a case of storing the position information when waiting for receiving the specific operation.

A third aspect of the present disclosure relates to a non-transitory computer-readable recording medium storing a control program for causing a controller of a portable information terminal for a user of a moving object to execute processing, in which

- the information terminal includes a display configured to perform a position instruction operation on a display image and the controller configured to perform movement control of the moving object based on a specific operation from the user on the display,
- the processing includes:
- causing the display to display a guidance image that prompts the specific operation when waiting for receiving the specific operation,
- storing position information of the specific operation performed by the user based on the guidance image, and
- displaying the guidance image that prompts the specific operation based on the position information on the display in a case of storing the position information when waiting for receiving the specific operation.

According to the present invention, an information terminal, a control method, and a computer-readable recording medium storing a control program that can improve operability during movement control can be provided.

BRIEF DESCRIPTION OF DRAWINGS

Exemplary embodiment(s) of the present invention will be described in detail based on the following figures, wherein.

DESCRIPTION OF EMBODIMENTS

Figure 1:
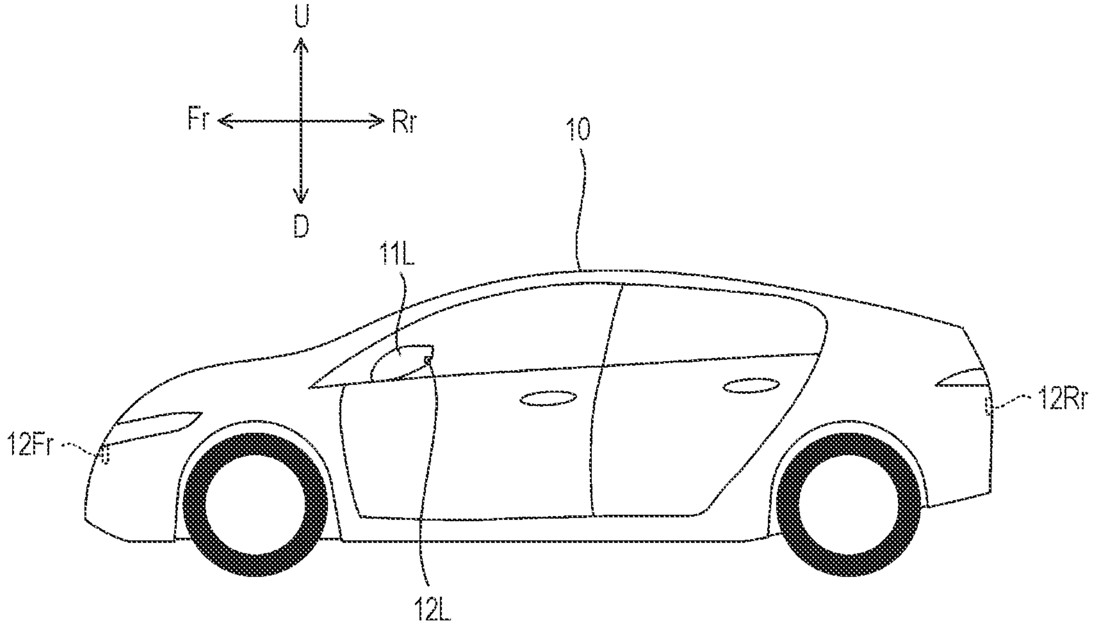
FIG. 1 is a side view showing an example of a vehicle whose movement is controlled by an information terminal according to the present embodiment.

Hereinafter, an embodiment of an information terminal, a control method, and a control program according to the present invention will be described with reference to the accompanying drawings. The drawings are viewed in directions of reference numerals. In addition, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 Whose Movement is Controlled by Information Terminal of Present Invention>

Figure 2:
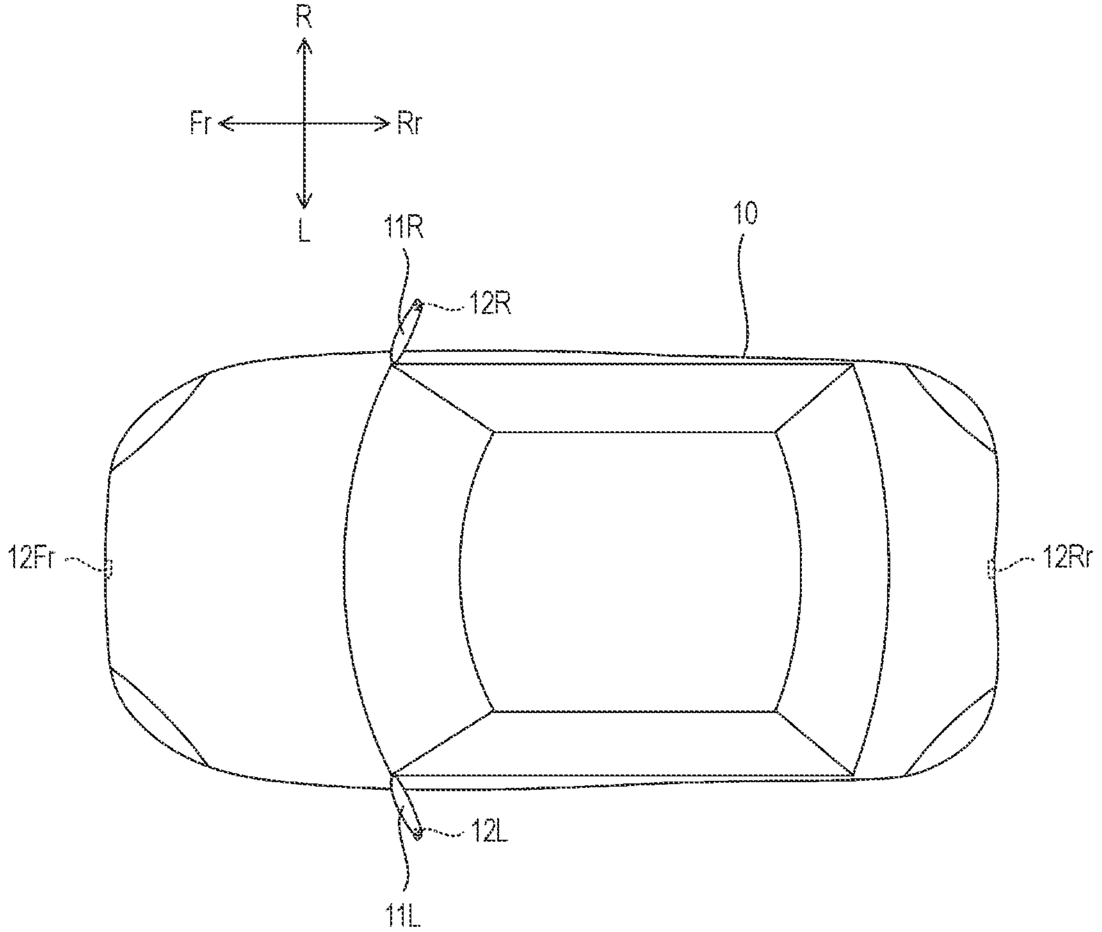
FIG. 2 is a top view of the vehicle shown in FIG. 1.

FIG. 1 is a side view of the vehicle 10 whose movement is controlled by the information terminal of the present invention. FIG. 2 is atop view of the vehicle 10 shown in FIG. 1. The vehicle 10 is an example of a moving object in the present invention.

The vehicle 10 is an automobile including a drive source (not shown) and wheels including driving wheels driven by power of the drive source and steering wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may also be an internal combustion engine such as a gasoline engine or a diesel engine, or a combination of an electric motor and an internal combustion engine. In addition, the drive source of the vehicle 10 may drive the pair of left and right front w % heels, may drive the pair of left and right rear wheels, or may drive four wheels, that is, the pair of left and right front wheels and the pair of left and right rear wheels. The front wheels and the rear wheels may both be steering wheels that are steerable, or the front wheels or the rear wheels may be steering wheels that are steerable.

The vehicle 10 further includes side mirrors 11L and 11R. The side mirrors 11L and 11R are mirrors (rearview mirrors) that are provided outside front seat doors of the vehicle 10 for the driver to check the rear side and a rear lateral side. Each of the side mirrors 11L and 11R is fixed to a body of the vehicle 10 by a rotation shaft extending in a vertical direction, and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of the front side of the vehicle 10. The rear camera 12Rr is a digital camera that is provided at a rear portion of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

<Internal Configuration of Vehicle 10>

Figure 3:
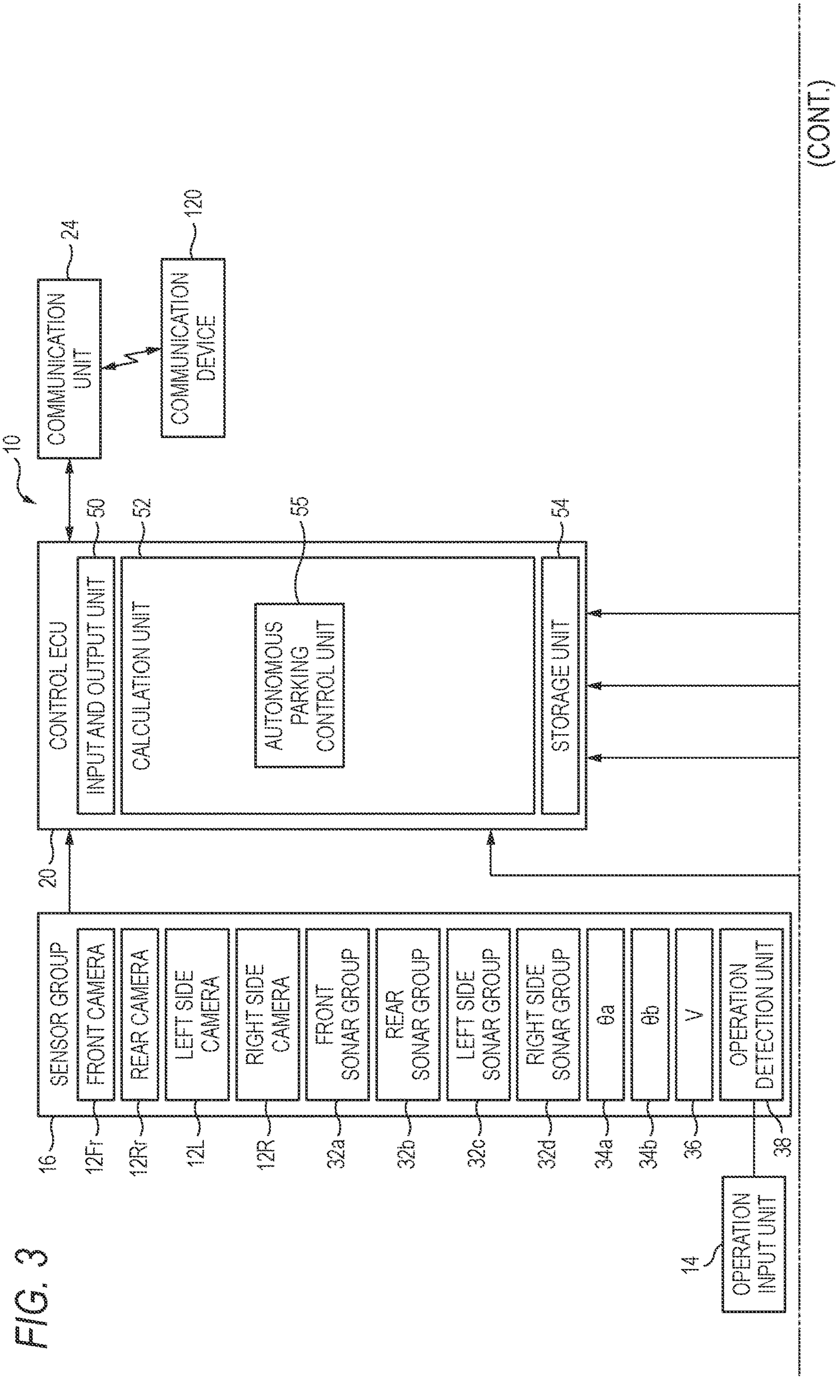
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. In addition, the sensor group 16 includes a front sonar group 32*a*, a rear sonar group 32*b*, a left side sonar group 32*c*, and a right side sonar group 32*d*. In addition, the sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire recognition data (for example, surrounding image) for recognizing an outside of the vehicle 10 by capturing images of surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image formed by the left side image and the right side image may be referred to as a side image.

The front sonar group 32*a*, the rear sonar group 32*b*, the left side sonar group 32*c*, and the right side sonar group 32*d* emit sound waves to the surroundings of the vehicle 10 and receive reflected sounds from other objects. The front sonar group 32*a* includes, for example, four sonars. The sonars constituting the front sonar group 32*a* are respectively provided on an obliquely left front side, a front left side, a front right side, and an obliquely right front side of the vehicle 10. The rear sonar group 32*b* includes, for example, four sonars. The sonars constituting the rear sonar group 32*b* are respectively provided on an obliquely left rear side, a rear left side, a rear right side, and an obliquely right rear side of the vehicle 10. The left side sonar group 32*c* includes, for example, two sonars. The sonars constituting the left side sonar group 32*c* are provided in a front side and a rear side of a left side portion of the vehicle 10, respectively. The right side sonar group 32*d* includes, for example, two sonars. The sonars constituting the right side sonar group 32*d* are provided in a front side and in a rear side of a right side portion of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by predetermined angles. The detection pulses output from the wheel sensors 34*a* and 34*b* are used to calculate the rotation angles of the wheels and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V. and outputs the detected vehicle speed V to the control ECU 20. The vehicle speed sensor 36 detects the vehicle speed V based on, for example, rotation of a countershaft of a transmission.

The operation detection unit 38 detects a content of an operation performed by a user using an operation input unit 14, and outputs the detected content of the operation to the control ECU 20. The operation input unit 14 includes, for example, various user interfaces such as a side mirror switch that switches opened and closed states of the side mirrors 11L and 11R, and a shift lever (a select lever or a selector).

The navigation device 18 detects a current position of the vehicle 10 by using, for example, a global positioning system (GPS), and guides the user along a route toward a destination. The navigation device 18 includes a storage device (not shown) that includes a map information database.

The navigation device 18 includes a touch panel 42 and a speaker 44. The touch panel 42 functions as an input device and a display device of the control ECU 20. The speaker 44 outputs various types of guide information to the user of the vehicle 10 by voice.

The touch panel 42 is configured to input various commands to the control ECU 20. For example, the user can input a command related to movement assistance of the vehicle 10 via the touch panel 42. The movement assistance includes parking assistance and exit assistance of the vehicle 10. In addition, the touch panel 42 is configured to display various screens related to a control content of the control ECU 20. For example, a screen related to the movement assistance of the vehicle 10 is displayed on the touch panel 42. Specifically, a parking assistance button for requesting the parking assistance of the vehicle 10 and an exit assistance button for requesting the exit assistance are displayed on the touch panel 42. The parking assistance button includes an autonomous parking button for requesting parking by autonomous steering of the control ECU 20 and a guidance parking button for requesting guidance when parking the vehicle by an operation of the driver. The exit assistance button includes an autonomous exit button for requesting exit by the autonomous steering of the control ECU 20 and a guidance exit button for requesting guidance w % ben the exit of the vehicle is performed by an operation of the driver. Constituent elements other than the touch panel 42, for example, a smartphone or a tablet terminal may be used as the input device or the display device.

The control ECU 20 includes an input and output unit 50, a calculation unit 52, and a storage unit 54. The calculation unit 52 is implemented by, for example, a central processing unit (CPU). The calculation unit 52 performs various types of control by controlling each unit based on a program stored in the storage unit 54. In addition, the calculation unit 52 receives and outputs signals from and to each unit connected to the control ECU 20 via the input and output unit 50.

The calculation unit 52 includes an autonomous parking control unit 55 configured to perform movement execution control of the vehicle 10. The autonomous parking control unit 55 performs autonomous parking assistance and autonomous exit assistance of the vehicle 10 by autonomous steering in which a steering 110 is autonomously operated under control of the autonomous parking control unit 55. In the autonomous parking assistance and the autonomous exit assistance, an accelerator pedal (not shown), a brake pedal (not shown), and the operation input unit 14 are autonomously operated. In addition, the autonomous parking control unit 55 performs guidance parking assistance and guidance exit assistance when the driver performs manual parking and manual exit of the vehicle 10 by operating the accelerator pedal, the brake pedal, and the operation input unit 14.

For example, based on the recognition data of the outside of the vehicle 10 which is acquired by the front camera 12Fr, the rear camera 12Rr, the left side camera 12L, and the right side camera 12R and a predetermined parking space designated by the user, the autonomous parking control unit 55 controls autonomous parking of parking the vehicle 10 in the designated predetermined parking space and autonomous exit of causing the vehicle 10 to exit from the predetermined parking space.

The autonomous parking control unit 55 registers the predetermined parking space designated by the user in the storage unit 54 as a designated parking space. Based on the recognition data of the outside of the vehicle 10 acquired by the front camera 12Fr, the rear camera 12Rr, the left side camera 12L, and the right side camera 12R, the autonomous parking control unit 55 registers feature points related to the designated parking space in the storage unit 54. Based on the recognition data of the outside of the vehicle 10 and the feature points of the designated parking space designated by the user, the autonomous parking control unit 55 controls the autonomous parking of parking the vehicle 10 in the designated parking space and autonomous exit of causing the vehicle 10 to exit from the designated parking space.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 connected to the steering 110, thereby enabling assistance of an operation performed by an occupant on the steering 110 and enabling autonomous steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. Another communication device 120 is a base station, a communication device of other vehicle, a smartphone or a tablet terminal carried by the user of the vehicle 10, or the like. The smartphone and the tablet are examples of the information terminal of the present invention.

The driving force control system 26 includes a driving ECU 130. The driving force control system 26 executes driving force control of the vehicle 10. The driving ECU 130 controls a driving force of the vehicle 10 by controlling an engine (not shown) or the like based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed by the user on the brake pedal (not shown).

<Movement Instruction Control Performed by Information Terminal>

Figure 4:
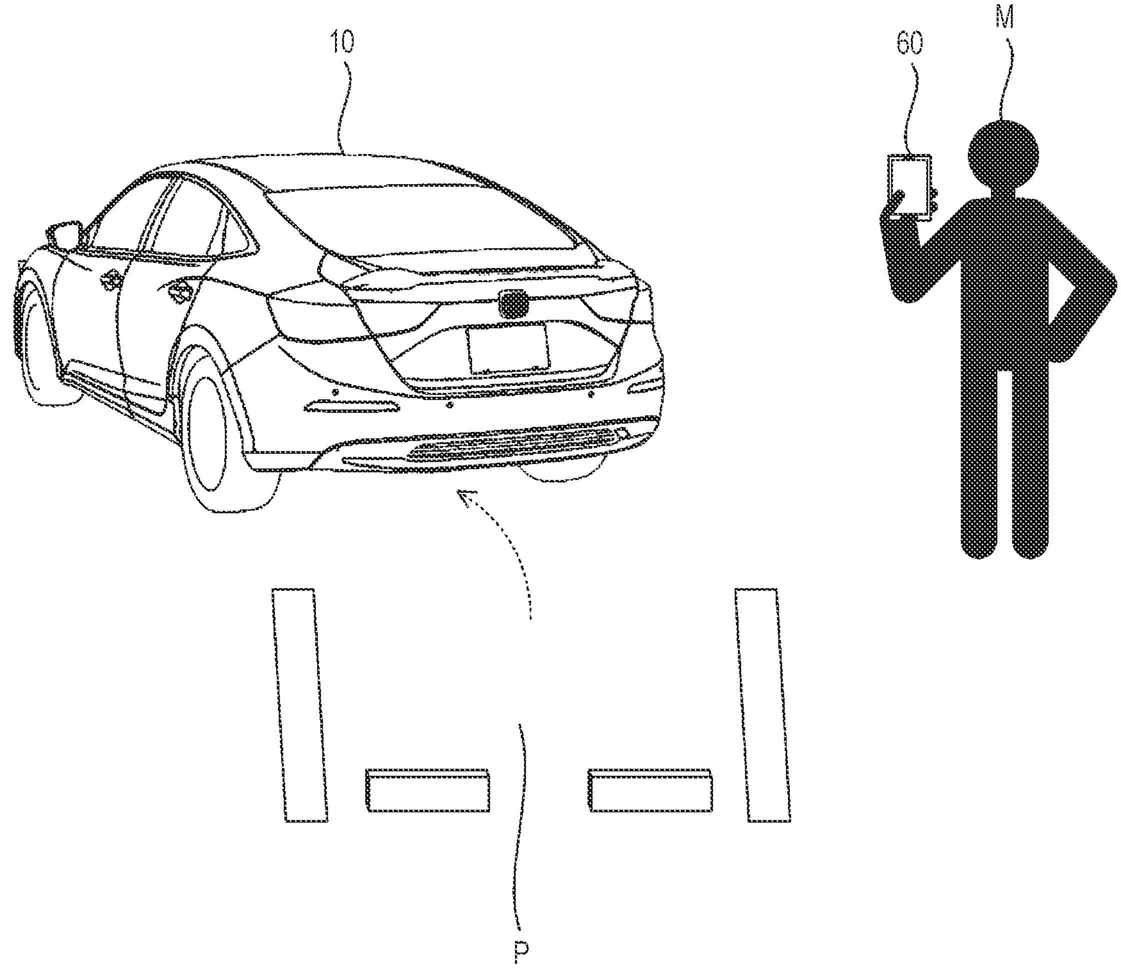
FIG. 4 is a diagram showing a state where exit instruction control of the vehicle is performed by using a smartphone from an outside of the vehicle.

FIG. 4 is a diagram showing an example of a state where a user M of the vehicle 10 performs movement instruction control of causing the vehicle 10 to autonomously exit from a parking space P by using a smartphone 60 carried by the user M from the outside of the vehicle 10. The movement instruction control is an example of movement control of the present invention. The movement instruction control includes, for example, parking instruction control of autonomously parking the vehicle 10 in the parking space P and exit instruction control of causing the vehicle 10 to autonomously exit from the parking space P. The example shown in FIG. 4 shows a state where the exit instruction control of the vehicle 10 is performed.

An application capable of controlling movement of the vehicle 10 by transmitting and receiving information related to the movement instruction control of the vehicle 10 to and from the vehicle 10 is installed in the smartphone 60. When a smartphone screen 61 (see FIG. 8 and the like) implemented as a touch panel is touched by the user M, the smartphone 60 transmits to the vehicle 10 an instruction signal for instructing autonomous exit of the vehicle 10 by the wireless communication. For example, bluetooth low energy (BLE: registered trademark) is used as the wireless communication. The vehicle 10 receives the instruction signal transmitted from the smartphone 60 through the communication unit 24. The autonomous parking control unit 55 of the vehicle 10 controls the autonomous exit of the vehicle 10 according to the instruction signal received through the communication unit 24.

<Hardware Configuration of Smartphone 60>

Figure 5:
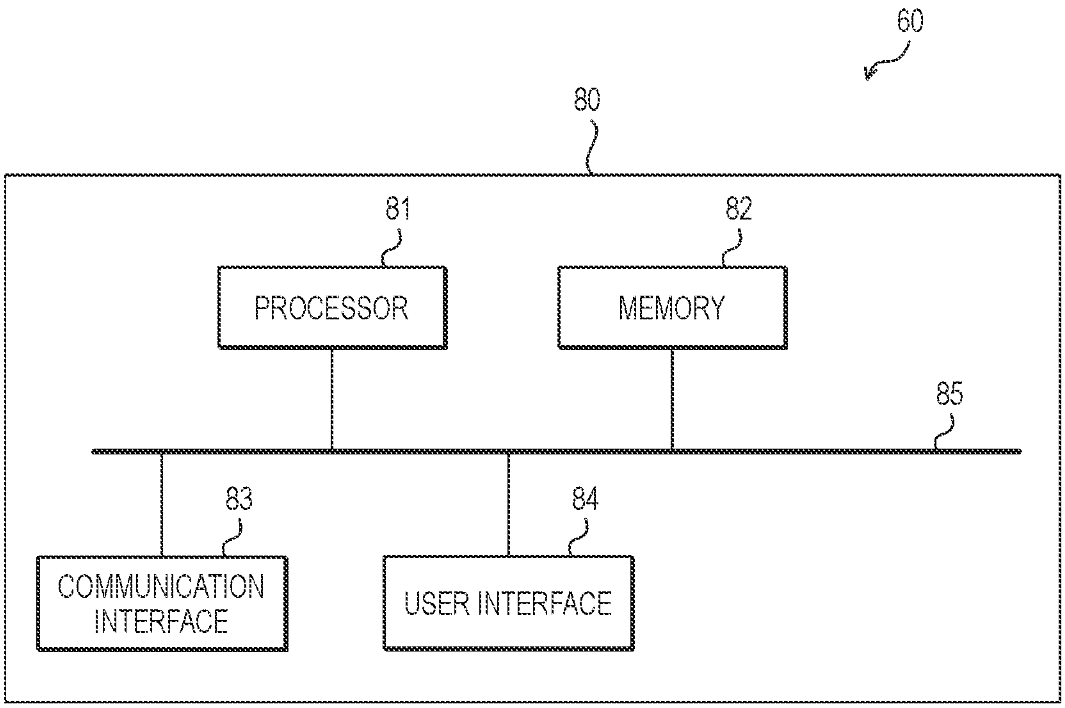
FIG. 5 is a diagram showing an example of a hardware configuration of the smartphone.

FIG. 5 is a diagram showing an example of a hardware configuration of the smartphone 60. The smartphone 60 can be implemented by, for example, an information processing device 80 shown in FIG. 5. The information processing device 80 includes a processor 81, a memory 82, a communication interface 83, and a user interface 84. The processor 81, the memory 82, the communication interface 83, and the user interface 84 are connected by, for example, a bus 85.

The processor 81 is a circuit that performs signal processing, and is, for example, a central processing unit (CPU) that controls the entire information processing device 80. The processor 81 is an example of a control unit of the present invention. The processor 81 may be implemented by another digital circuit such as a field programmable gate array (FPGA) or a digital signal processor (DSP). In addition, the processor 81 may be implemented by combining a plurality of digital circuits.

The memory 82 includes, for example, a main memory and an auxiliary memory. The main memory is, for example, a random access memory (RAM). The main memory is used as a work area of the processor 81.

The auxiliary memory is, for example, a nonvolatile memory such as a magnetic disk, an optical disk, or a flash memory. Various programs for causing the information processing device 80 to operate are stored in the auxiliary memory. The programs stored in the auxiliary memory are loaded onto the main memory and executed by the processor 81.

In addition, the auxiliary memory may include a portable memory removable from the information processing device 80. Examples of the portable memory include a universal serial bus (USB) flash drive, a memory card such as a secure digital (SD) memory card, and an external hard disk drive.

The communication interface 83 is a communication interface that performs the wireless communication with an outside of the information processing device 80 (for example, the communication unit 24 of the vehicle 10). The communication interface 83 is controlled by the processor 81.

The user interface 84 includes, for example, an input device that receives an operation input from the user M and an output device that outputs information to the user M. The input device can be implemented by, for example, a touch panel. The output device can be implemented by, for example, a display and a speaker. The user interface 84 is controlled by the processor 81.

For example, the processor 81 performs the movement instruction control instructing the movement of the vehicle 10. Specifically, the processor 81 performs the movement instruction control of the vehicle 10 based on a specific operation of the user M on the smartphone screen 61 of the smartphone 60. The specific operation includes a continuous position instruction operation (for example, swiping operation), a rotation instruction operation in a predetermined rotation direction (for example, rotation swiping operation), and the like. The smartphone screen 61 is an example of a display unit of the present invention.

Further, the processor 81 performs control of generating a guidance image that prompts the specific operation of the user M on the smartphone screen 61 of the smartphone 60 and causing the smartphone screen 61 to display the generated guidance image. The guidance image includes, for example, a position guidance image that prompts a position instruction operation, a rotation guidance image that prompts the rotation instruction operation, and the like. Specifically, the processor 81 causes the smartphone screen 61 to display the guidance image when waiting for reception of the specific operation. The time of waiting for reception includes a situation where the specific operation performed by the user M is required, a situation where the user M is expected to perform the specific operation, and the like.

When the user M performs the specific operation based on the guidance image displayed on the smartphone screen 61, the processor 81 stores position information related to the performed specific operation in the memory 82. The processor 81 stores, for example, position information related to a specific operation for each of a clockwise rotation instruction operation in a clockwise direction and a counterclockwise rotation instruction operation in a counterclockwise direction. The position information related to the specific operation is information such that the user M performs the specific operation at which position on the smartphone screen 61 (for example, a right side position or a left side position of the screen). However, when the specific operation performed by the user M is a specific operation that is not based on the guidance image displayed on the smartphone screen 61, for example, when the operation is completely different from the guidance image displayed on the smartphone screen 61, the processor 81 does not store the operation information in the memory 82. The processor 81 stores the position information related to the specific operation in the memory 82 when the processing of the movement instruction control of the vehicle 10 is completed, and does not store the position information when the processing is not completed.

In a case where the position information is stored in the memory 82 when the processor 81 waits for reception of the specific operation, the processor 81 displays the guidance image that prompts the specific operation based on the position information on the smartphone screen 61. Specifically, in a case where the position information of the specific operation performed by the user M is stored in the memory 82 when the processor 81 waits for reception of the specific operation, the processor 81 causes the smartphone screen 61 to display the guidance image that prompts the specific operation and indicates a position based on the position information on the smartphone screen 61. Specifically, in a case where the position information that indicates a range of the specific operation performed by the user M is in the memory 82 when the processor 81 waits for reception of the specific operation, the processor 81 causes the smartphone screen 61 to display the guidance image that prompts the specific operation and on which an image that indicates the range where the user M performs the specific operation on the smartphone screen 61 is superimposed. The position based on the position information indicates a narrow area on the smartphone screen 61, and the range where the specific operation is performed indicates a relatively wide area on the smartphone screen 61.

In a case where the position information is in the memory 82 when the processor 81 waits for reception of the specific operation, the processor 81 changes the image that indicates the range where the specific operation is performed based on the history of receiving the specific operation from the user M. Specifically, when the number of times of the reception of the same specific operation increases, gradation display of the image that indicates the range where the specific operation is performed is lightly displayed or hidden. The image that indicates the range where the previous-time specific operation is performed is displayed darker, and the image that indicates the range where the second previous-time specific operation is performed is displayed lighter than the previous image. Furthermore, it is also possible to store the range where the specific operation is performed a plurality of times, and display the image in an averaged range.

Example of Movement Instruction Control Performed by Processor 81

Next, an example of the movement instruction control of the vehicle 10 performed by the processor 81 of the smartphone 60 will be described with reference to FIGS. 6 to 14.

Figure 6:
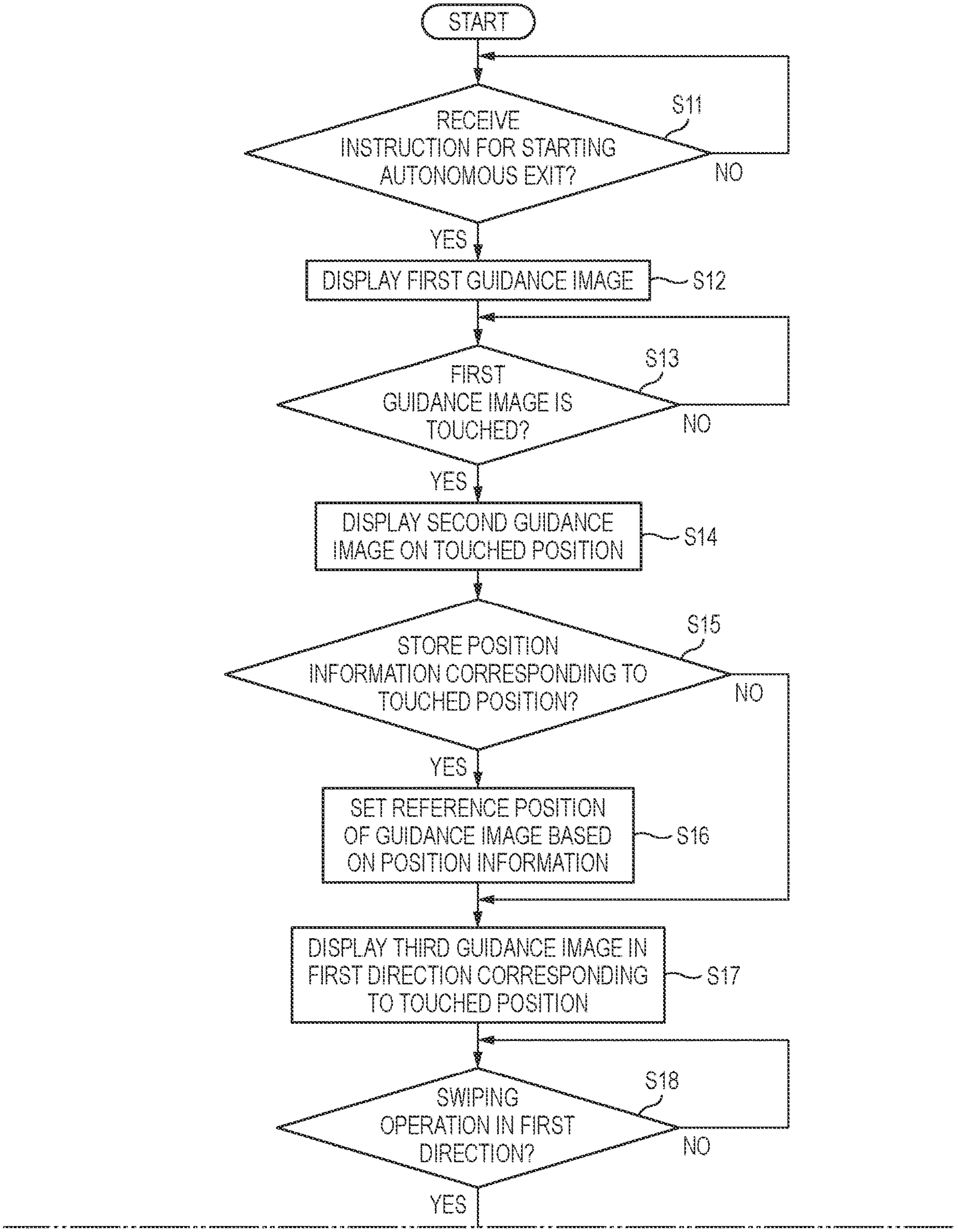
FIG. 6 is a flowchart showing the exit instruction control of the vehicle performed by a processor.
Figure 7:
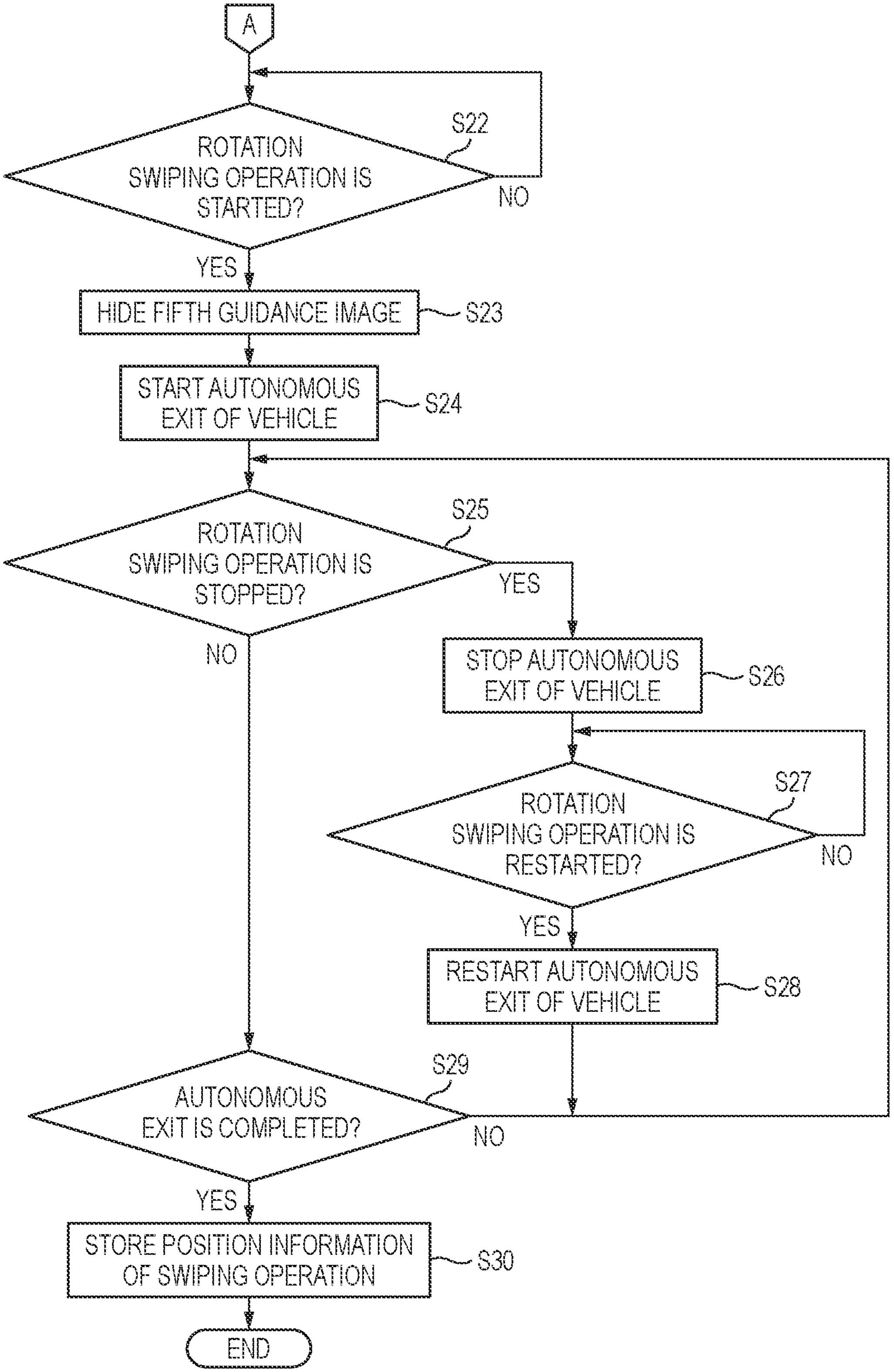
FIG. 7 is a flowchart showing the exit instruction control of the vehicle performed by the processor.

FIGS. 6 and 7 are flowcharts showing the exit instruction control of the vehicle 10 performed by the processor 81 of the smartphone 60. FIGS. 8 to 14 are diagrams showing examples of the images displayed on the smartphone screen 61 of the smartphone 60 that performs the exit instruction control on the vehicle 10.

The processing shown in FIG. 6 is started, for example, when the autonomous exit button (not shown) displayed on the smartphone screen 61 of the smartphone 60 is touched. The exit instruction control is executed in, for example, the situation as shown in FIG. 4 in which the user M attempts to cause the vehicle 10 to autonomously exit from the parking space P by using the smartphone 60.

The processor 81 determines whether the autonomous exit instruction for starting the autonomous exit is received (step S11).

In step S11, when the autonomous exit instruction is not received (step S11: No), the processor 81 repeats the processing of step S11 and waits until the autonomous exit instruction is received.

In step S11, when the autonomous exit instruction is received (step S11: Yes), the processor 81 displays on the smartphone screen 61 a first guidance image 62 that guides the autonomous exit instruction operation (step S12).

Figure 8:
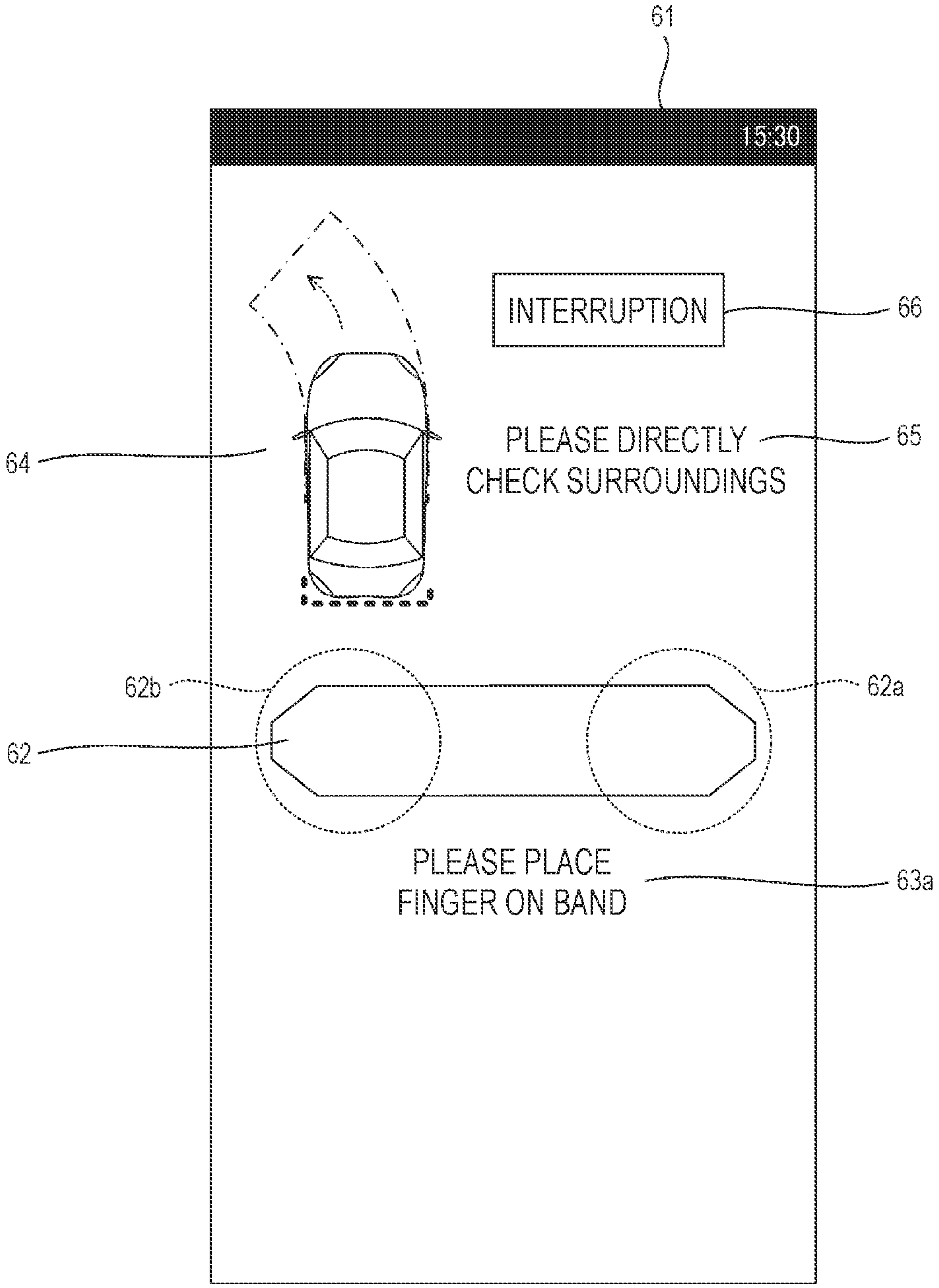
FIG. 8 is a diagram showing an example of an image displayed on the smartphone that performs the exit instruction control on the vehicle.
Figure 9:
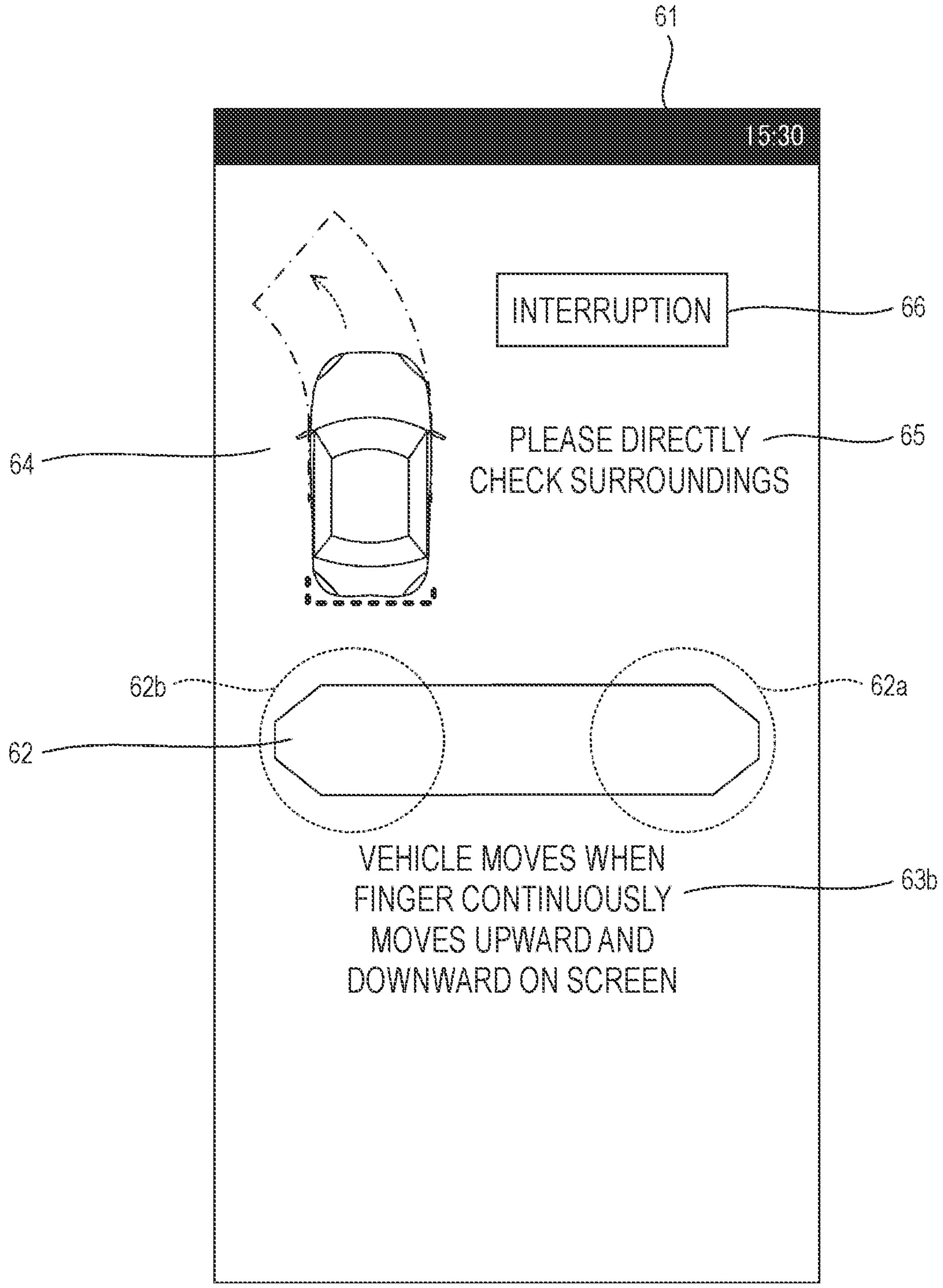
FIG. 9 is a diagram showing an example of an image displayed on the smartphone that performs the exit instruction control on the vehicle.

As shown in FIGS. 8 and 9, the first guidance image 62 is displayed, for example, as a long horizontal bar extending in the left-right direction on the smartphone screen 61. The up, down, left, and right directions of the smartphone screen 61 are directions based on, for example, orientations of characters displayed on the smartphone screen 61. Below the first guidance image 62 on the smartphone screen 61, a guide message 63*a* (see FIG. 8) of operation guide which indicates that "please place finger on band (long horizontal bar)" and a guide message 63*b* (see FIG. 9) of the operation guide which indicates that "vehicle moves when finger continuously moves upward and downward on screen" are alternately displayed. The first guidance image 62 is displayed substantially in a center of the smartphone screen 61 in the upper-lower direction. Further, above the first guidance image 62 on the smartphone screen 61, an execution state image 64 that indicates an execution state of the exit instruction control for the vehicle 10 is displayed. An attention message 65 which indicates that "please directly check surroundings" for drawing attention of the user M who performs an instruction operation, and an interruption button 66 for interrupting the autonomous exit control are displayed on a right side of the execution state image 64.

Next, the processor 81 determines whether the first guidance image 62 displayed in step S12 is touched (step S13). Specifically, the processor 81 determines whether the finger is placed on the first guidance image 62 (long horizontal bar).

In step S13, if the first guidance image 62 is not touched (step S13: No), the processor 81 repeats the processing of step S13 and waits until the first guidance image 62 is touched.

In step S13, if the first guidance image 62 is touched (step S13: Yes), the processor 81 displays a second guidance image 67*a* or a second guidance image 67*b* at the touched position (step S14).

Figure 10:
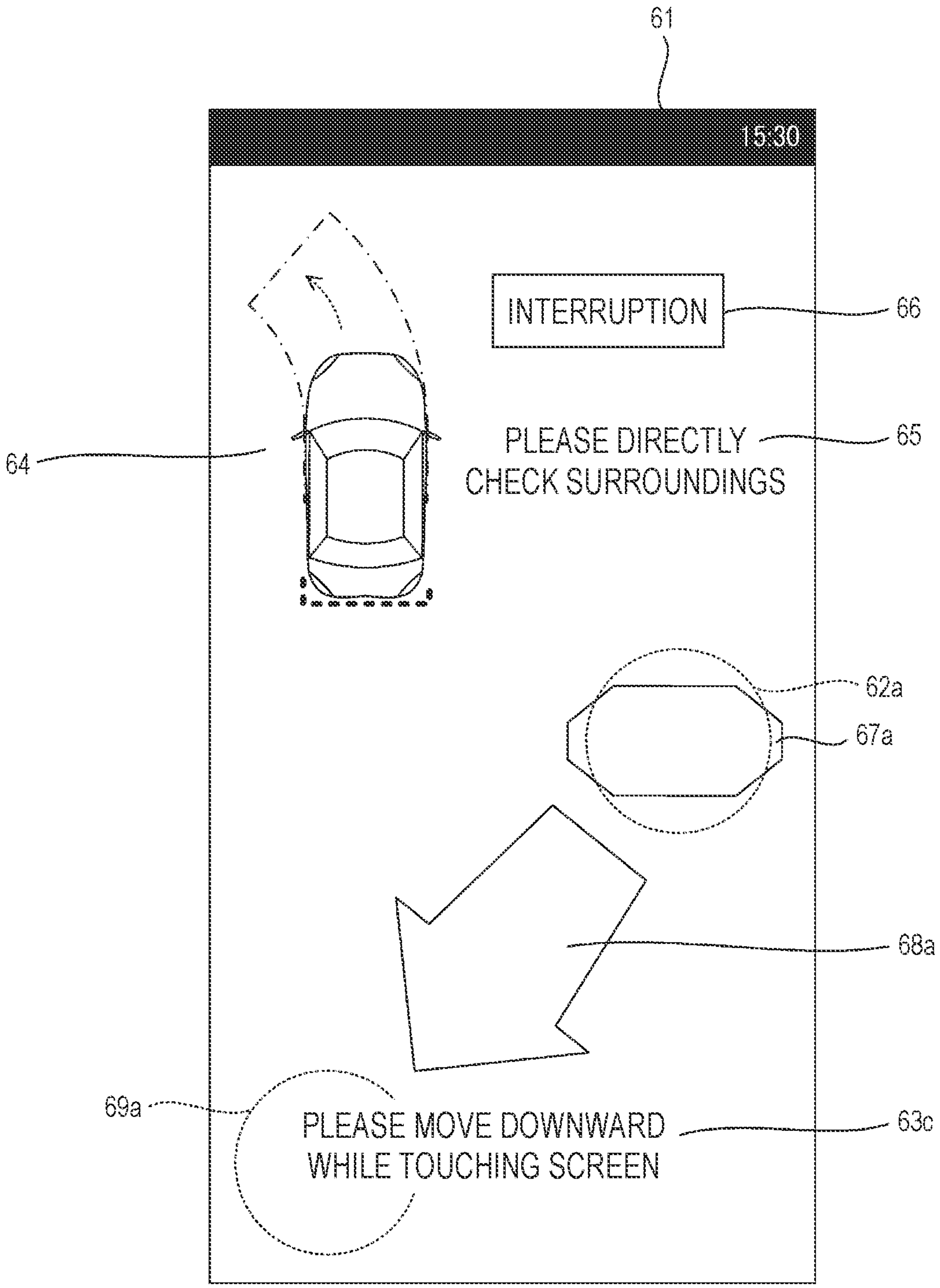
FIG. 10 is a diagram showing an example of an image displayed on the smartphone that performs the exit instruction control on the vehicle.
Figure 11:
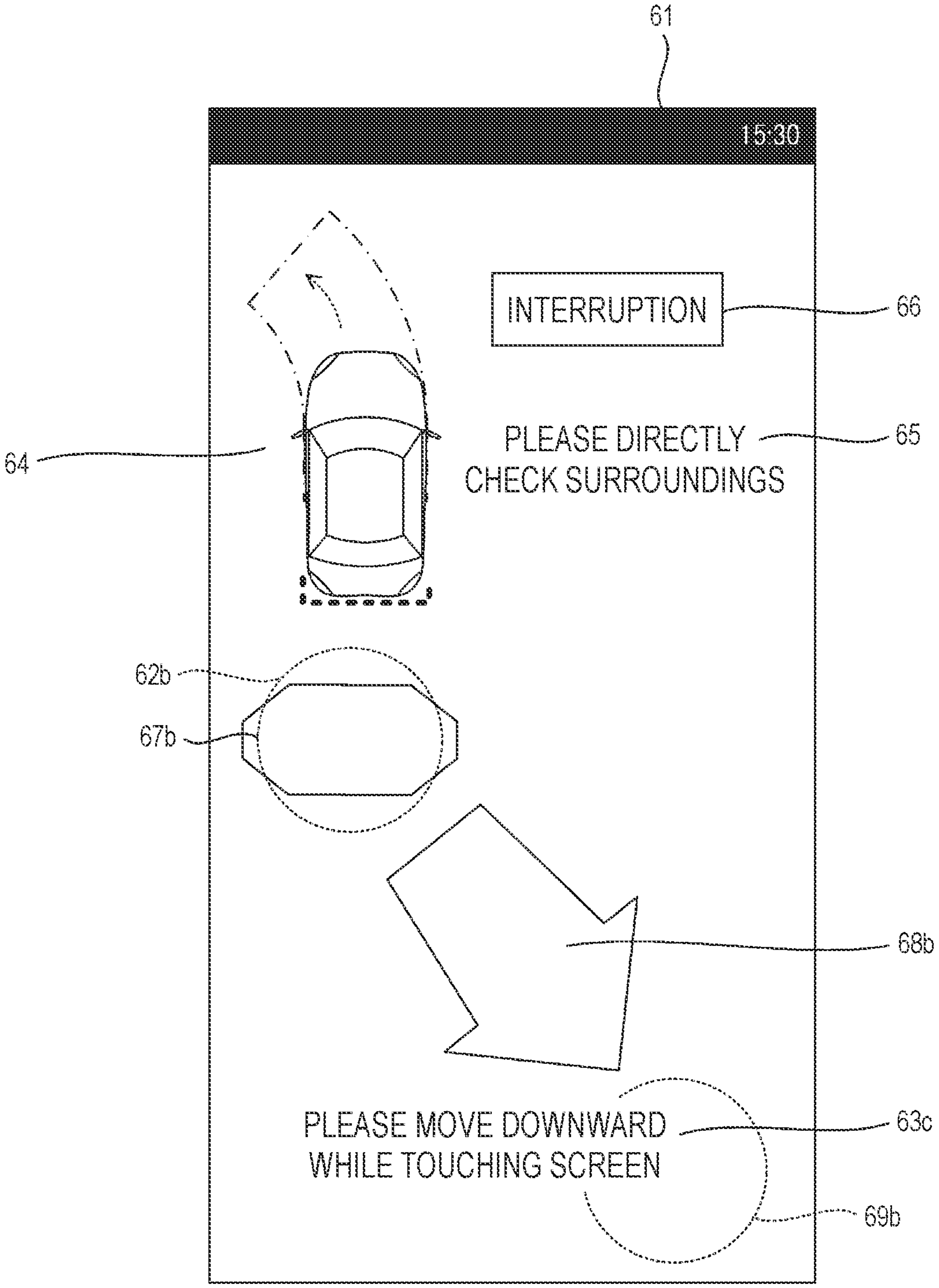
FIG. 11 is a diagram showing an example of an image displayed on the smartphone that performs the exit instruction control on the vehicle.

As shown in FIGS. 10 and 11, the second guidance images 67*a* and 67*b* are displayed, for example, as long horizontal bars shorter in the left-right direction than the first guidance image 62 at first positions 62*a* and 62*b* touched by the user M (placed with a finger) in the first guidance image 62. The second guidance image 67*a* shown in FIG. 10 is a guidance image that is displayed when the user M touches the first position 62*a* which is a portion on a right side of the first guidance image 62. The second guidance image 67*b* shown in FIG. 11 is a guidance image that is displayed when the user M touches the first position 62*b* which is a portion on a left side of the first guidance image 62.

Next, the processor 81 determines whether position information corresponding to the first positions 62*a* and 62*b* touched by the user M in the first guidance image 62, that is, the positions where the second guidance images 67*a* and 67*b* are displayed is stored in the memory 82 (step S15).

In step S15, when the position information is not stored in the memory 82 (step S15: No), the processor 81 directly proceeds to processing of step S17.

In step S15, when the position information (step S15: Yes) is stored in the memory 82, the processor 81 sets a reference position of the guidance image that prompts the specific operation based on the stored position information (step S16) and then directly proceeds to the processing of step S17.

Here, it is assumed that the autonomous exit of the vehicle 10 using the smartphone 60 is a first-time autonomous exit, and the position information related to the guidance image that prompts the specific operation is not stored in the memory 82. Therefore, the processor 81 proceeds directly to the processing of step S17 in step S15.

Next, the processor 81 displays third guidance images 68*a* and 68*b* directed in first directions corresponding to the positions where the second guidance images 67*a* and 67*b* are displayed in step S14, that is, the positions touched by the user M (step S17).

The first direction corresponding to the position where the second guidance image 67*a* is displayed is a direction corresponding to the first position 62*a* touched by the user M at the right side in the first guidance image 62, and for example, in the case shown in FIG. 10, the first direction is a direction including a leftward direction symmetrical to the first position 62*a* at the right side. Specifically, as in the example shown in FIG. 10, the first direction is a direction toward the second position 69*a* provided in an area obliquely left below the first position 62*a*. Similarly, the first direction corresponding to the position where the second guidance image 67*b* is displayed is a direction corresponding to the first position 62*b* touched by the user M at the left side in the first guidance image 62, and for example, in the case shown in FIG. 11, the first direction is a direction including a rightward direction symmetrical to the first position 62*b* at the left side. Specifically, as in the example shown in FIG. 11, the first direction is a direction toward the second position 69*b* provided in an area obliquely right below the first position 62*b*.

As shown in FIG. 10, the third guidance image 68*a* is displayed, for example, as an arrow image pointing from the first position 62*a* on the right side to the second position 69*a*, which is an instruction position obliquely downward to the left. The third guidance image 68*a* is displayed as an image that prompts the user M to perform the continuous position instruction operation in the first direction from the first position 62*a* to the second position 69*a*. The continuous position instruction operation is, for example, a swiping operation from the first position 62*a* to the second position 69*a*. Similarly, as shown in FIG. 11, the third guidance image 68*b* is displayed, for example, as an arrow image pointing from the first position 62*b* on the left side to the second position 69*b*, which is an instruction position obliquely downward to the right. The third guidance image 68*b* is displayed as an image that prompts the user M to perform the continuous position instruction operation in the first direction from the first position 62*b* to the second position 69*b*. A guide message 63*c* that guides the continuous position instruction operation and indicates that "please move downward while touching screen" is displayed below each of the third guidance images 68*a* and 68*b*.

Accordingly, when the first position 62*a* on the right side is touched, the second guidance image 67*a* is displayed, and then the arrow image that guides the swiping operation to the lower left side is displayed. When the first position 62*b* on the left side is touched, the second guidance image 67*b* is displayed, and then the arrow image that guides the swiping operation to the lower right side is displayed. The second guidance images 67*a* and 67*b* displayed at the first positions 62*a* and 62*b* are guidance images that serve as starting points for the continuous position instruction operation (swiping operation).

Next, the processor 81 determines whether a first swiping operation is performed in the first directions from the positions where the second guidance images 67*a* and 67*b* are displayed, that is, in the directions indicated by the arrow images of the third guidance images 68*a* and 68*b* (step S18).

In step S18, when the first swiping operation is not performed (step S18: No), the processor 81 repeats the processing of step S18 and waits until the first swiping operation is performed.

In step S18, when the first swiping operation is performed (step S18: Yes), the processor 81 displays a fourth guidance image 70 directed in second directions corresponding to the positions where the second guidance images 67*a* and 67*b* are displayed, that is, the positions touched by the user M (step S19).

Figure 12:
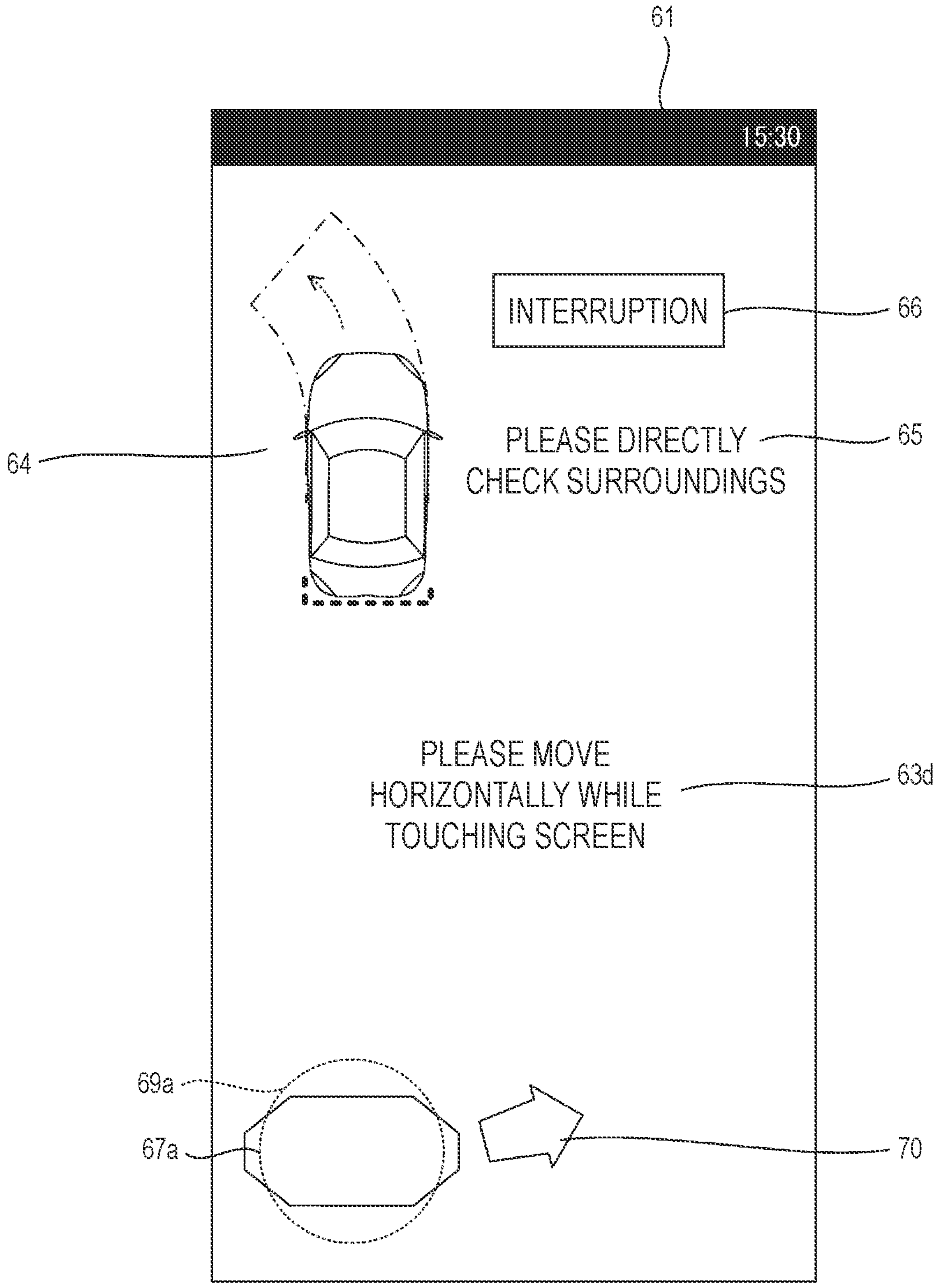
FIG. 12 is a diagram showing an example of an image displayed on the smartphone that performs the exit instruction control on the vehicle.

For example, when the first swiping operation is performed in the first direction from the first position 62*a* where the second guidance image 67*a* is displayed, as shown in FIGS. 10 and 12, the second guidance image 67*a* displayed at the first position 62*a* is moved to the second position 69*a* obliquely downward to the left and displayed. Then, the fourth guidance image 70 is displayed in the second direction from the position of the second guidance image 67*a* moved to the second position 69*a* and displayed.

The second direction corresponding to the position where the second guidance image 67*a* is displayed is a direction corresponding to the first position 62*a* touched by the user M at the right side in the first guidance image 62. The second direction is a direction different from the first direction from the first position 62*a* to the second position 69*a* obliquely downward to the left shown in FIG. 10, that is, different from the direction indicated by the third guidance image 68*a*.

For example, when the first swiping operation is performed in the first direction (direction toward second position 69*a*) from the first position 62*a* where the second guidance image 67*a* is displayed, as shown in FIG. 12, the fourth guidance image 70 is displayed as an arrow image pointing, for example, to the right direction different from the first direction (direction indicated by third guidance image 68*a*) from the position of the second guidance image 67*a* displayed at the second position 69*a*. The fourth guidance image 70 is displayed as an image that prompts the user M to perform the continuous position instruction operation in the second direction different from the first direction. The continuous position instruction operation is, for example, a swiping operation from the second position 69*a* toward the right direction. A guide message 63*d* that guides the continuous position instruction operation and indicates that "please move horizontally while touching screen" is displayed above the fourth guidance image 70.

Although not shown, when the first swiping operation is performed in the first direction (direction toward second position 69*b*) from the first position 62*b* where the second guidance image 67*b* is displayed, the second direction is a direction different from an obliquely downward right direction (first direction) indicated by the arrow image of the third guidance image 68*b* shown in FIG. 11. Then, the fourth guidance image 70 is displayed, for example, as an arrow image pointing to the left direction from the position of the second guidance image 67*b* displayed at the second position 69*b*.

In this way, when the first position 62*a* on the right side is touched, the second guidance image 67*a* is moved to the second position 69*a* obliquely downward to the left and is displayed, and then the arrow image that guides the swiping operation to the right direction is displayed. When the first position 62*b* on the left side is touched, the second guidance image 67*b* is moved to the second position 69*b* obliquely downward to the right and is displayed, and then the arrow image that guides the swiping operation to the left direction is displayed.

For example, the fourth guidance image 70 is displayed toward the second direction different from an instruction position of the swiping operation toward the first direction in FIG. 10, that is, the first direction before a tip of the third guidance image 68*a* indicated by the arrow image reaches an edge of the smartphone screen 61 (before protrudes from the smartphone screen 61). The fourth guidance image 70 may be displayed toward the second direction different from the first direction when a distance of the instruction position of the swiping operation in the first direction, that is, a length of the third guidance image 68*a* indicated by the arrow image exceeds a predetermined length.

Next, the processor 81 determines whether a second swiping operation is performed in the second directions from the second positions 69*a* and 69*b* where the second guidance images 67*a* and 67*b* are displayed, that is, in the direction indicated by the arrow image of the fourth guidance image 70 (step S20).

In step S20, when the second swiping operation is not performed (step S20: No), the processor 81 repeats the processing of step S20 and waits until the second swiping operation is performed.

In step S20, when the second swiping operation is performed (step S20: Yes), the processor 81 displays a fifth guidance image 71 in rotation directions corresponding to the positions where the second guidance images 67*a* and 67*b* are first displayed, that is, the positions where the touch operation is started (step S21).

Figure 13:
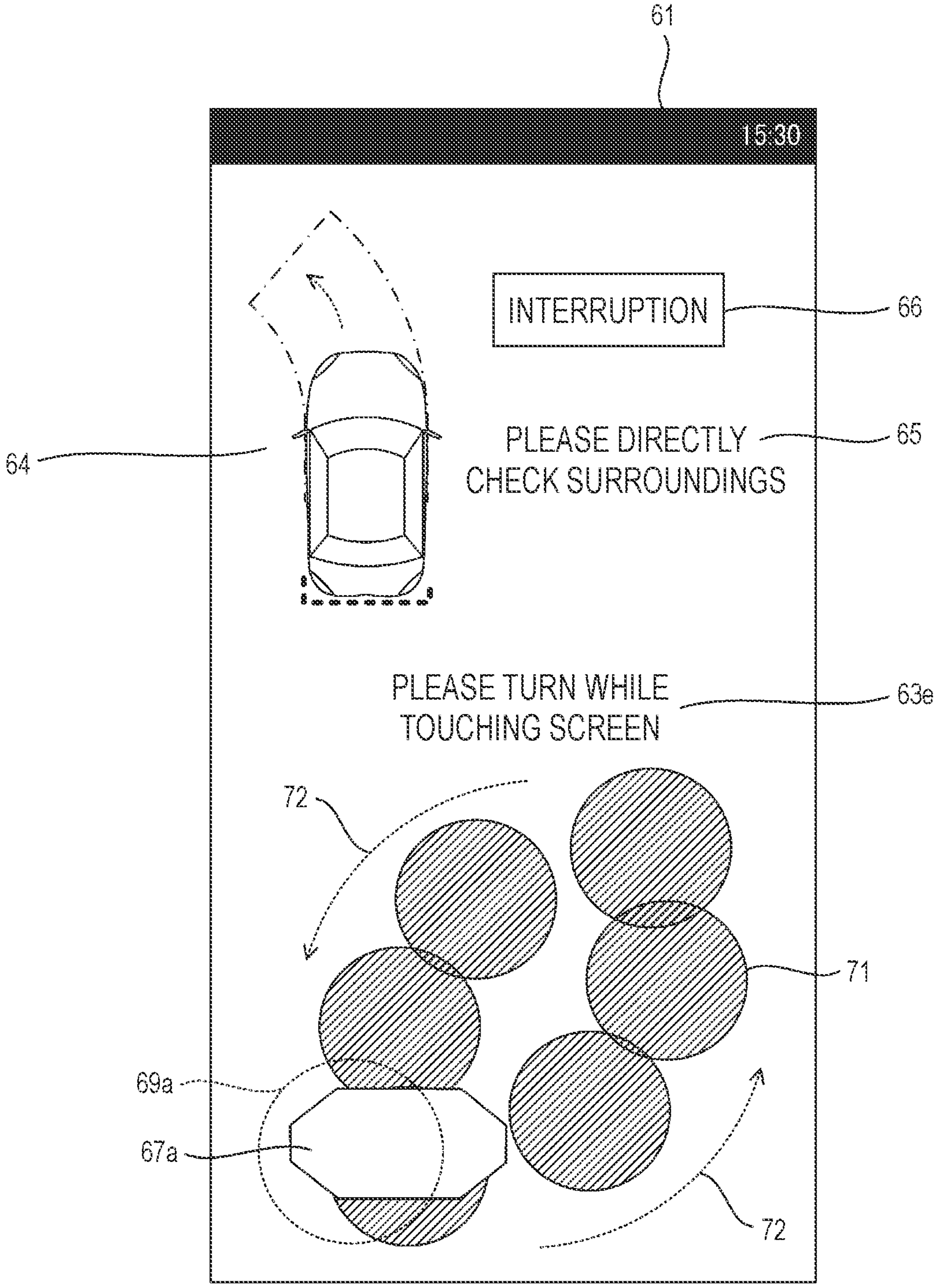
FIG. 13 is a diagram showing an example of an image displayed on the smartphone that performs the exit instruction control on the vehicle.

For example, the rotation direction corresponding to the position where the second guidance image 67*a* is displayed is a rotation direction corresponding to the first position 62*a* touched by the user M at the right side in the first guidance image 62. When the first position 62*a* on the right side is touched, the corresponding rotation direction becomes counterclockwise rotation. In this case, the smartphone screen 61 displays the counterclockwise rotation fifth guidance image 71. Specifically, as shown in FIG. 13, when the first position 62*a* on the right side is touched, the fifth guidance image 71 in the counterclockwise rotation state indicated by arrows 72 is displayed. For example, the fifth guidance image 71 is displayed as if six spheres are rotating counterclockwise. The fifth guidance image 71 is displayed in a manner of rotating from the position of the second guidance image 67*a* displayed at the second position 69*a*. The fifth guidance image 71 is displayed as a rotation guidance image that prompts the user M to perform a rotation instruction operation that causes the counterclockwise rotation. The rotation instruction operation that causes the counterclockwise rotation is, for example, a rotation swiping operation in which one or more fingers slide counterclockwise. A guide message 63*e* that guides the rotation instruction operation and indicates that "please turn while touching screen" is displayed above the fifth guidance image 71.

Although not shown, when the first position 62*b* on the left side is touched, the corresponding clockwise rotation fifth guidance image 71 is displayed. Specifically, the fifth guidance image 71 is displayed in a manner that the six spheres begin to rotate clockwise from the position of the second guidance image 67*b* displayed at the second position 69*b* in FIG. 11.

Accordingly, when the first position 62*a* on the right side is touched, a plurality of counterclockwise rotation spherical images that guide a counterclockwise rotation swiping operation from the position of the second guidance image 67*a* moved to the second position 69*a* are displayed. When the first position 62*b* on the left side is touched, a plurality of clockwise rotation spherical images that guide a clockwise rotation swiping operation from the position of the second guidance image 67*b* moved to the second position 69*b* are displayed. The second guidance images 67*a* and 67*b* displayed at the first positions 62*a* and 62*b* are rotation guidance images that serve as starting points for the rotation instruction operation (rotation swiping operation).

Next, the processor 81 proceeds to processing shown in FIG. 7 and determines whether the rotation swiping operation is started (step S22).

In step S22, when the rotation swiping operation is not started (step S22. No), the processor 81 repeats the processing of step S22 and waits until the rotation swiping operation is started.

In step S22, when the rotation swiping operation is started (step S22: Yes), the processor 81 hides the fifth guidance image 71 displayed on the smartphone screen 61, and displays an instruction icon 73 that moves to follow the instruction position of the rotation swiping operation of the user M (step S23).

Figure 14:
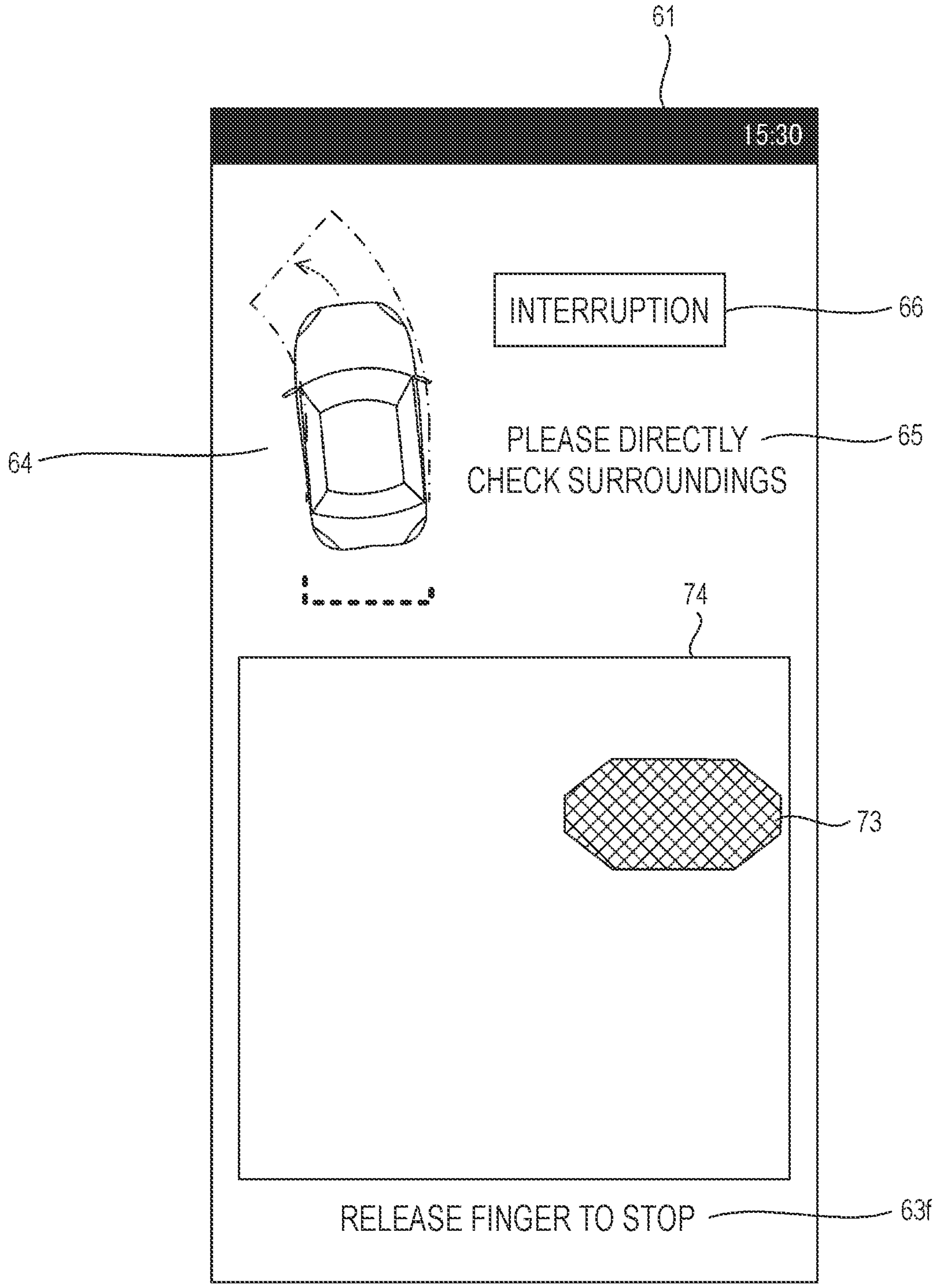
FIG. 14 is a diagram showing an example of an image displayed on the smartphone that performs the exit instruction control on the vehicle.

For example, as shown in FIG. 14, the fifth guidance image 71 (see FIG. 13) that is displayed using six rotation spheres is hidden, and the instruction icon 73 representing the autonomous exit instruction of the vehicle 10 is displayed. The instruction icon 73 moves to follow the touch position of the user M on the smartphone screen 61. The instruction icon 73 is an instruction icon in which the second guidance image 67*a* displayed in FIG. 13 moves to follow the finger movement of the rotation swiping operation of the user M. In addition, a guide message 63*f* for stopping the autonomous exit of the vehicle 10 is displayed, which indicates that "release the finger to stop". Accordingly, when the rotation swiping operation is performed on the smartphone screen 61, the instruction icon 73 rotationally moves to follow the touch position, and the vehicle 10 starts to move according to the rotational movement. In addition, when the finger that touches the smartphone screen 61 is released from the smartphone screen 61, the movement of the vehicle 10 stops.

Next, the processor 81 transmits an exit starting signal to the vehicle 10 to start the autonomous exit of the vehicle 10 (step S24). Accordingly, the autonomous parking control unit 55 of the vehicle 10 starts the autonomous exit of the vehicle 10 according to the exit starting signal transmitted from the smartphone 60. When the autonomous exit of the vehicle 10 is started, as shown in FIG. 14, an image corresponding to the movement of the vehicle 10, that is, the execution state image 64 of the vehicle 10 exiting from the parking space P is displayed.

Next, the processor 81 determines whether the rotation swiping operation on the smartphone screen 61 is stopped (step S25).

In step S25, when the rotation swiping operation is stopped (step S25: Yes), the processor 81 transmits an exit stop signal to the vehicle 10 to stop the autonomous exit of the vehicle 10 (step S26).

Next, the processor 81 determines whether the rotation swiping operation on the smartphone screen 61 is restarted (step S27).

In step S27, when the rotation swiping operation is not restarted (step S27: No), the processor 81 waits until the rotation swiping operation is restarted.

In step S27, when the rotation swiping operation is restarted (step S27: Yes), the processor 81 restarts the instruction control of the autonomous exit of the vehicle 10 (step S28), returns to step S23, and repeats the processing.

Meanwhile, in step S25, when the rotation swiping operation is not stopped (step S25: No), the processor 81 determines whether the autonomous exit of the vehicle 10 is completed (step S29). Completion of the autonomous exit of the vehicle 10 can be recognized based on, for example, an exit completion signal transmitted from the autonomous parking control unit 55 of the vehicle 10. The autonomous exit is completed when the vehicle 10 moves out of the parking space P, for example.

In step S29, when the autonomous exit of the vehicle 10 is not completed (step S29: No), the processor 81 returns to step S25 and repeats the processing.

In step S29, when the autonomous exit of the vehicle 10 is completed (step S29: Yes), the processor 81 stores the position information of the swiping operation performed by the user M in the memory 82 (step S30), and ends the processing of the exit instruction control. The position information of the swiping operation performed by the user M includes information of the touch position of the first guidance image 62 touched by the user M in step S13, the position information of the first swiping operation performed by the user M in step S18, the position information of the second swiping operation performed by the user M in step S20, and the position information of the rotation swiping operation performed by the user M in step S22. The processor 81 stores in the memory 82 the position information indicating where on the smartphone screen 61 the user M performs the swiping operation. In the middle of the series of processing described above, for example, when the user M touches the interruption button 66 during the series of processing described above, the processor 81 ends the processing of the exit instruction control.

<Second-Time and Subsequent-Time Movement Instruction Control>

Next, the exit instruction control for second-time and subsequent-time autonomous exit using the smartphone 60 will be described with reference to FIGS. 15 to 19 and flowcharts of FIGS. 6 and 7. FIGS. 15 to 19 are diagrams showing examples of images displayed on the smartphone screen 61 of the smartphone 60, and correspond to FIGS. 10 to 14 in the above-described first-time exit instruction control.

In cases of second-time and subsequent-time exit instruction control, the processing from step S11 to step S16 in FIG. 6 is executed in the same manner as the processing from step S11 to step S16 in the above-described first-time exit instruction control. In the following description, it is assumed that the exit instruction control is the second-time and subsequent-time exit instruction control.

For example, it is assumed that the first positions 62*a* and 62*b* of the first guidance image 62 touched by the user M during the second-time autonomous exit are the same side positions as the first positions 62*a* and 62*b* of the first guidance image 62 touched by the user M in the first-time autonomous exit. Specifically, it is assumed that the user M touches the first position 62*a* on the right side of the first guidance image 62 both during the first-time autonomous exit and during the second-time autonomous exit, or that the user M touches the first position 62*b* on the left side of the first guidance image 62 both during the first-time autonomous exit and during the second-time autonomous exit.

Since the position information of the first-time swiping operation performed by the user M is stored in the memory 82 (namely, the position information is in the memory 82), the processor 81 proceeds to step S16 in branch processing of step S15, and sets the reference position of the guidance image that prompts the specific operation based on the stored position information of the first-time swiping operation. The reference position of the guidance image is a position that serves as a display reference for the guidance images (third guidance images 68*a* and 68*b*, fourth guidance image 70, and fifth guidance image 71) displayed on the smartphone screen 61. The reference position of the guidance image includes, for example, positions corresponding to the second position 69*a* shown in FIGS. 10, 12, and 13 and the second position 69*b* shown in FIG. 11 in the first-time exit instruction control.

For example, when the position of the first swiping operation performed by the user M in step S18 in the first-time exit instruction control is a position at the right side of the third guidance image 68*a* (see FIG. 10) displayed on the smartphone screen 61, the reference position of the guidance image set in step S16 in the second-time exit instruction control, that is, a second position 169*a*, is set to a position at the right side of the second position 69*a* shown in FIG. 10. Similarly, when the position of the first swiping operation performed by the user M in step S18 in the first-time exit instruction control is a position at the left side of the third guidance image 68*b* (see FIG. 11) displayed on the smartphone screen 61, the reference position of the guidance image set in step S16 in the second-time exit instruction control, that is, a second position 169*b*, is set to a position at the right side of the second position 69*b* shown in FIG. 11.

Next, the processor 81 displays third guidance images 168*a* and 168*b* directed in the first directions corresponding to the positions where the second guidance images 67*a* and 67*b* are displayed in step S14, that is, the positions touched by the user M, and directed to the second position 169*a* and 169*b* on the right side and the left side set in step S16 (step S17).

Figure 15:
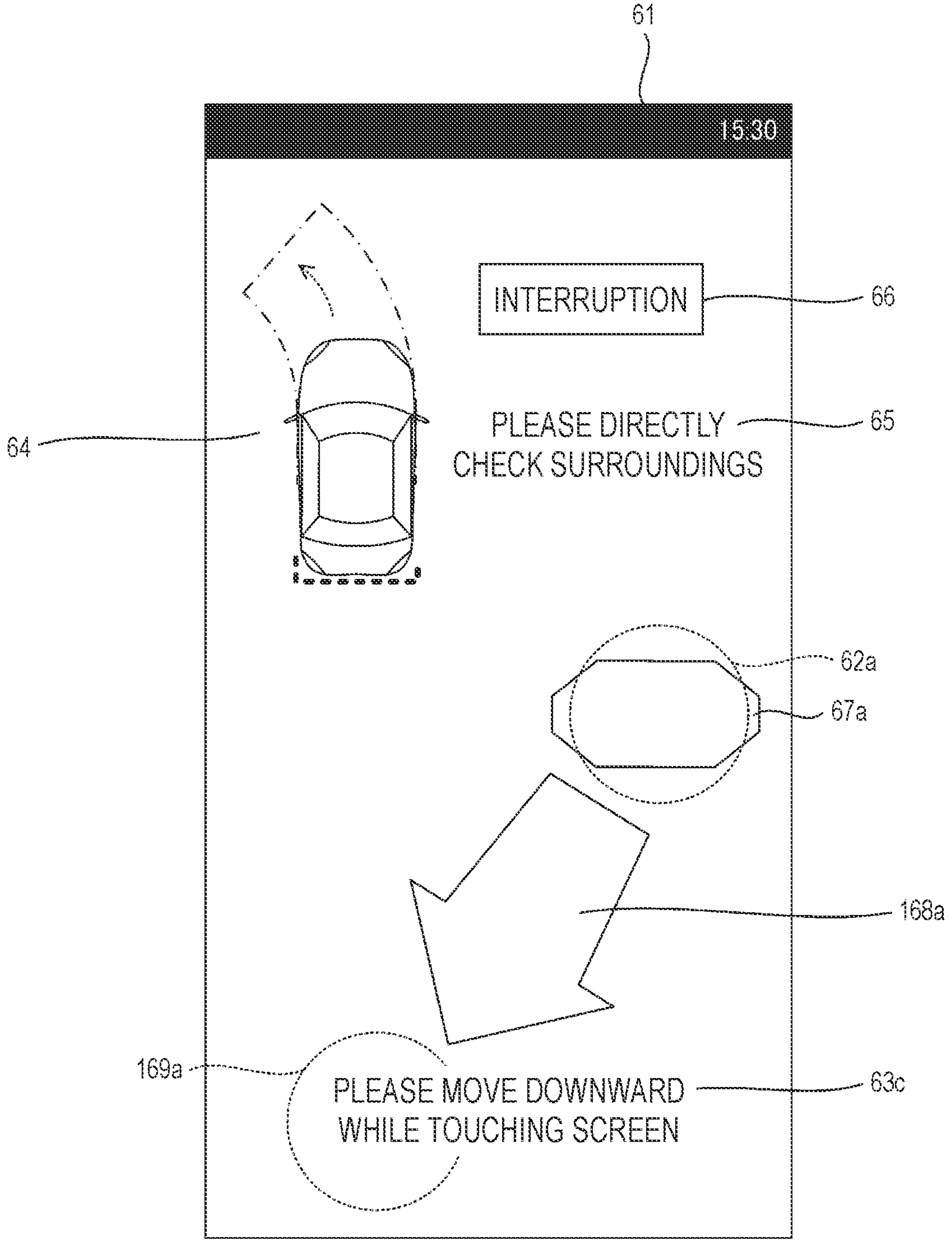
FIG. 15 is a diagram showing an example of an image displayed on the smartphone that performs the exit instruction control on the vehicle.
Figure 16:
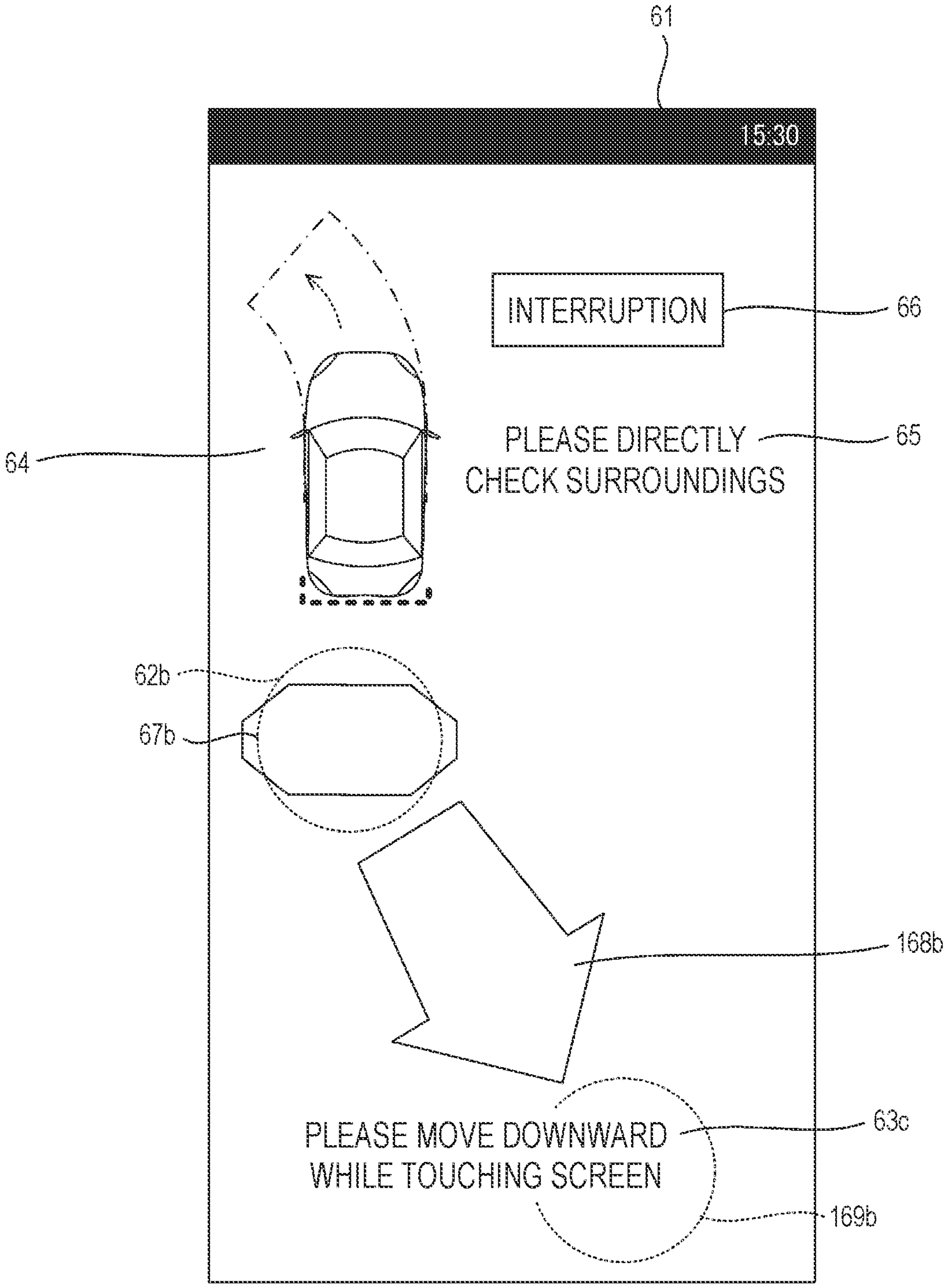
FIG. 16 is a diagram showing an example of an image displayed on the smartphone that performs the exit instruction control on the vehicle.

The third guidance image 168*a* which is directed to the second position 169*a* on the right side in the first direction corresponding to the position where the second guidance image 67*a* is displayed is, for example, the third guidance image 168*a* shown in FIG. 15. As shown in FIG. 15, the third guidance image 168*a* is displayed toward the second position 169*a* displayed at the position on the right side of the position of the second position 69*a* shown in FIG. 10. The third guidance image 168*b* which is directed to the second position 169*b* on the left side in the first direction corresponding to the position where the second guidance image 67*b* is displayed is, for example, the third guidance image 168*b* shown in FIG. 16. As shown in FIG. 16, the third guidance image 168*b* is displayed toward the second position 169*b* displayed at a position on the left side of the position of the second position 69*b* shown in FIG. 11.

Next, the processor 81 determines whether the first swiping operation in the first directions indicated by the third guidance images 168*a* and 168*b* is performed (step S18), when the first swiping operation is performed (S18: Yes), the processor 81 displays a fourth guidance image 170 directed in the second direction, starting from a position of a second guidance image 167*a* displayed after being moved to the second position 169*a* or 169*b* on the right side or the left side (step S19).

Figure 17:
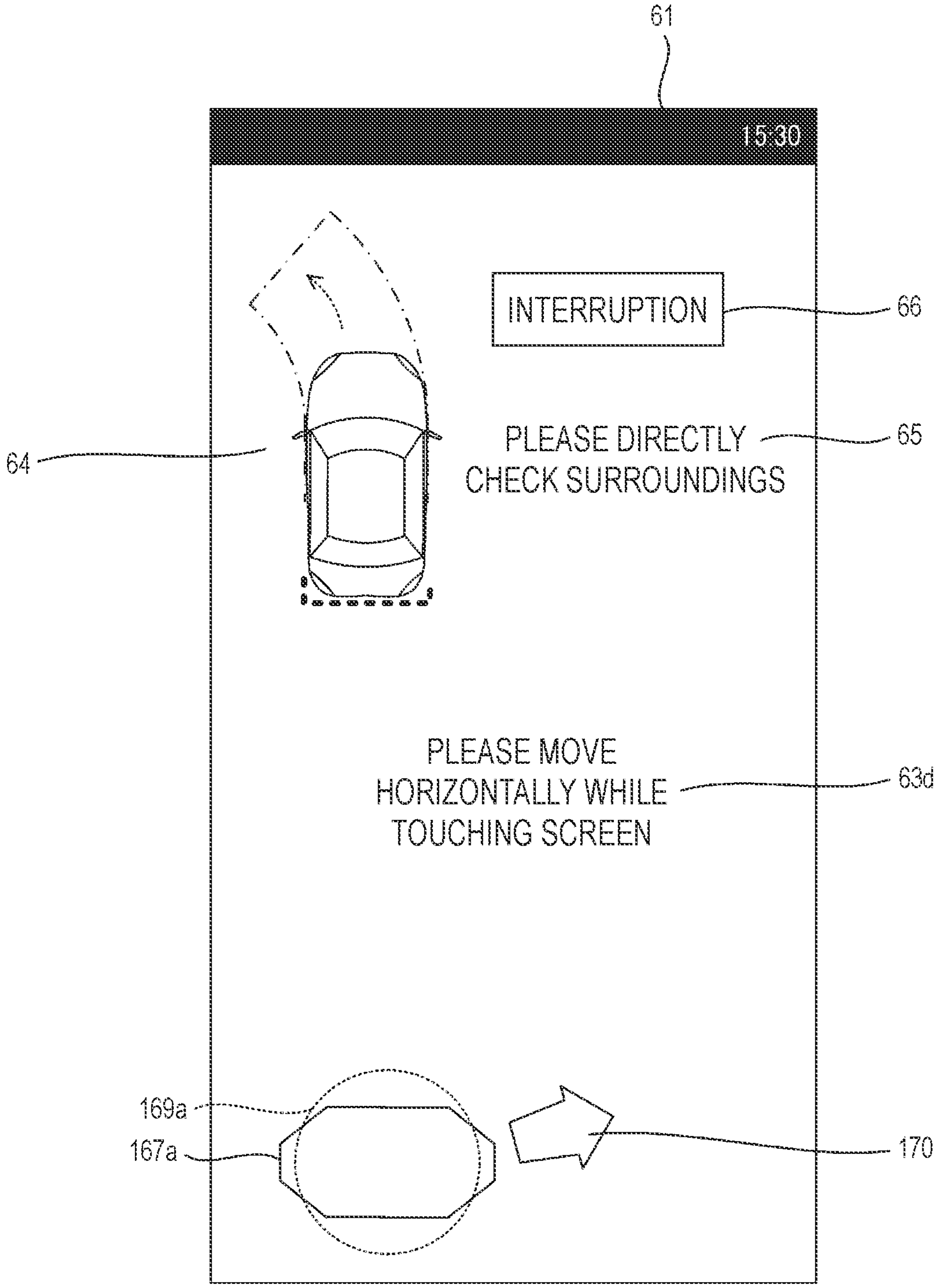
FIG. 17 is a diagram showing an example of an image displayed on the smartphone that performs the exit instruction control on the vehicle.

Specifically, when the first swiping operation is performed in the first direction (direction toward second position 169*a*) from the first position 62*a* where the second guidance image 67*a* is displayed, as shown in FIG. 17, the fourth guidance image 170 is displayed as an arrow image pointing, for example, to the right direction different from the first direction (direction indicated by third guidance image 168*a*), starting from the position of the second guidance image 167*a* displayed at the second position 169*a* on the right side. The fourth guidance image 170 is displayed on the right side of the fourth guidance image 70 shown in FIG. 12.

Although not shown, when the first swiping operation is performed in the first direction (direction toward second position 169*b*) from the first position 62*b* where the second guidance image 67*b* is displayed, the fourth guidance image 170 is displayed as an arrow image pointing, for example, to the left direction, starting from the position of the second guidance image displayed at the second position 169*b* on the left side.

In this case, for example, when the position of the second swiping operation performed by the user M in step S20 in the first-time exit instruction control is a position at a right side or a left side of the position of the fourth guidance image 70 displayed in FIG. 12, the position indicated by the fourth guidance image 170 in FIG. 17 displayed in step S19 may be displayed to be the right side or the left side of the position indicated by the fourth guidance image 70 shown in FIG. 12.

Next, the processor 81 determines whether the second swiping operation in the second direction indicated by the fourth guidance image 170 is performed (step S20). When the second swiping operation is performed (S20: Yes), the processor 81 displays a fifth guidance image 171 in the rotation direction corresponding to the position where the touch operation is started, starting from the position of the second guidance image 167*a* displayed at the second position 169*a* or 169*b* on the right side or the left side (step S21).

Figure 18:
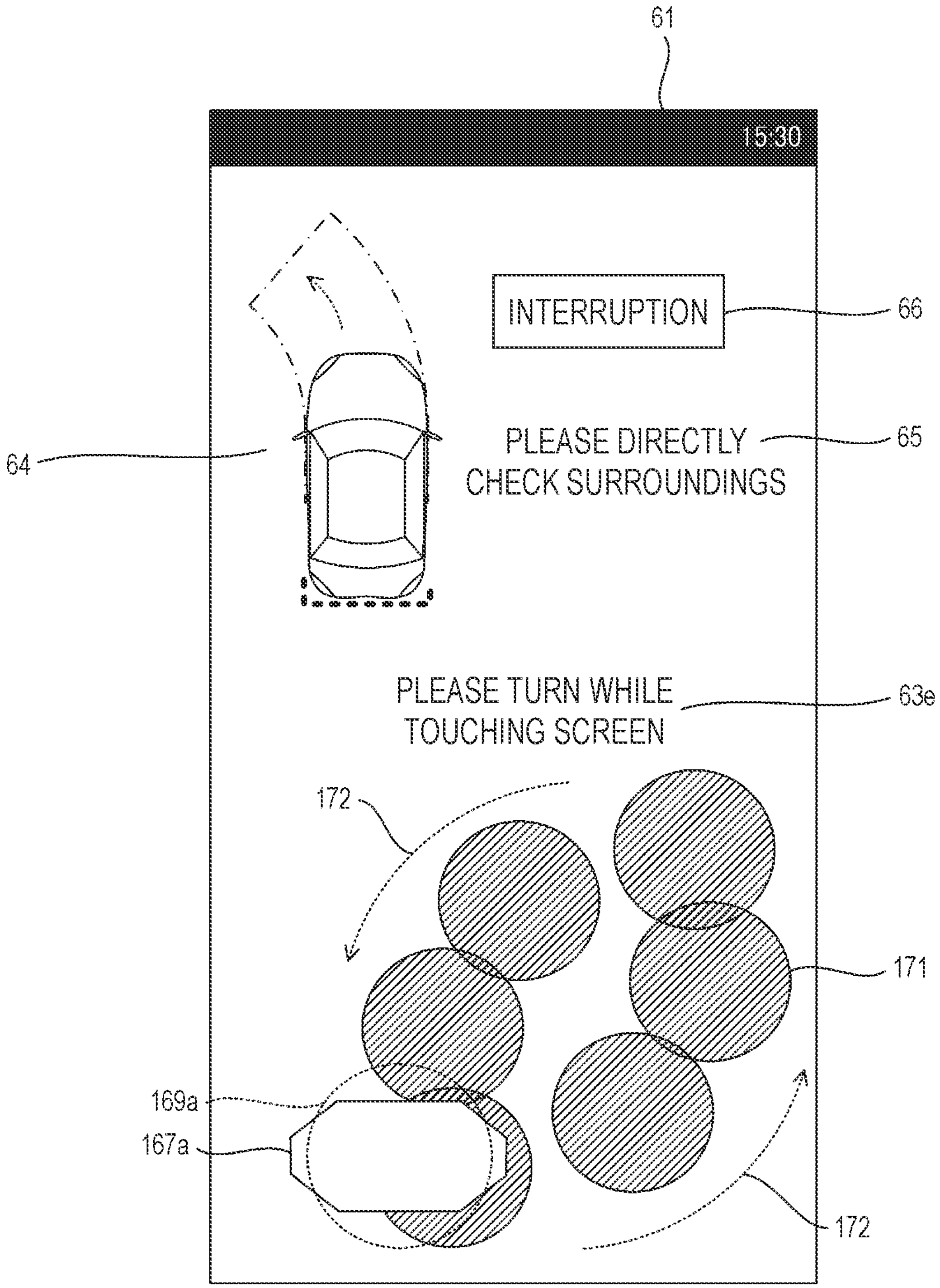
FIG. 18 is a diagram showing an example of an image displayed on the smartphone that performs the exit instruction control on the vehicle.

Specifically, when the second swiping operation is performed in the second direction from the right second position 169*a* where the second guidance image 167*a* is displayed, as shown in FIG. 18, the fifth guidance image 171 is displayed as a guidance image that guides a counterclockwise rotation swiping operation as indicated by arrows 172 starting from the position of the second guidance image 167*a* displayed at the second position 169*a* on the right side. The fifth guidance image 171 is displayed on a right side of the fifth guidance image 71 shown in FIG. 13.

Although not shown, when the second swiping operation is performed in the second direction from the second position 169*b* on the left side where the second guidance image is displayed, the fifth guidance image 171 is displayed as a clockwise rotation guidance image starting from the position of the second guidance image displayed at the second position 169*b* on the left side.

In this case, for example, when the position of the rotation swiping operation performed by the user M in step S22 in the first-time exit instruction control is a position on the right side or the left side of the position of the rotation swiping operation displayed in FIG. 13, the rotation position of the fifth guidance image 171 of FIG. 18 displayed in step S21 may be displayed to be the right side or the left side of the rotation position of the fifth guidance image 71 shown in FIG. 13.

Next, the processor 81 proceeds to the processing shown in FIG. 7, determines whether the rotation swiping operation is started (step S22), and when the rotation swiping operation is started (step S22: Yes), the processor 81 hides the fifth guidance image 171, and then displays an instruction icon 173 that moves to follow the instruction position of the rotation swiping operation of the user M, starting from the position of the second guidance image 167*a* displayed at the second positions 169*a* or 169*b* on the right side or the left side (step S23).

Figure 19:
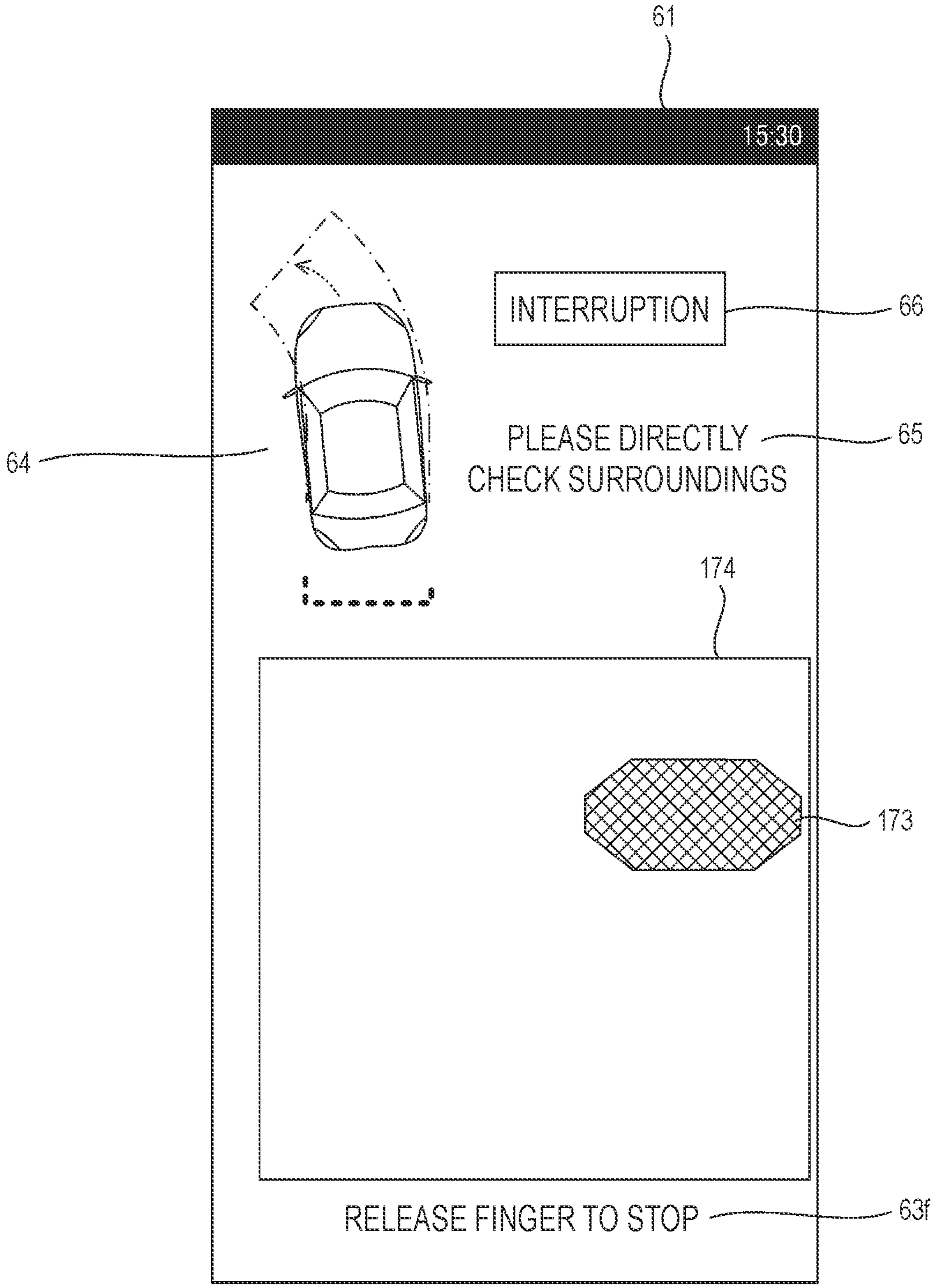
FIG. 19 is a diagram showing an example of an image displayed on the smartphone that performs the exit instruction control on the vehicle.

Specifically, as shown in FIG. 19, a swiping frame 174 for performing the rotation swiping operation is displayed starting from the position of the second guidance image 167*a* displayed at the second position 169*a* on the right side, and the instruction icon 173 is displayed within the swiping frame 174. The swiping frame 174 and the instruction icon 173 are displayed on a right side of the positions of the swiping frame 74 and the instruction icon 73 shown in FIG. 14.

Next, the processor 81 proceeds to the processing of step S22 and causes the vehicle 10 to start the autonomous exit. The processing from step S22 to step S29 is executed in the same manner as the processing from step S22 to step S29 in the above-described first-time exit instruction control. In step S30, the processor 81 stores in the memory 82 the position information of the swiping operation performed by the user M in the second-time exit instruction control, and ends the processing of the exit instruction control.

In the above-described example of the exit instruction control, the second-time exit instruction control has been described, but the same control is performed in third-time and subsequent-time exit instruction control. In the second-time exit instruction control, the guidance image that prompts the specific operation is displayed based on the position information of the swiping operation stored in the memory 82 in the first-time exit instruction control, but in a case of the third-time and subsequent-time exit instruction control, the present invention is not limited thereto. For example, in the third-time exit instruction control, the guidance image may be displayed based on the previous position information, or the guidance image may be displayed based on average position information in the position information for the past several times.

As described above, the processor 81 of the smartphone 60 causes the smartphone screen 61 to display a guidance image that prompts a specific operation (swiping operation, rotation swiping operation) when waiting for reception of the specific operation, and stores position information of the specific operation performed by the user M based on the guidance image. When the position information is stored at the time of waiting for reception of the specific operation, the guidance image that prompts the specific operation is displayed based on the position information on the smartphone screen 61. Accordingly, the guidance image can be displayed based on the position of the operation accepted as the specific operation in the swiping operation performed by the user M in the past. Therefore, the user M can be guided to an operation with less burden, and usability can be improved.

In a case where the position information is stored (namely, if the position information is in the memory 82) when waiting for reception of the specific operation, the processor 81 displays the guidance image that prompts the specific operation and instructs the position based on the position information on the smartphone screen 61. Accordingly, the specific operation can be performed according to the guidance image that instructs the operation position, and thus, the user M can be guided to an operation with less burden, and the usability is improved.

The processor 81 of the smartphone 60 stores the position information for each of the rotation instruction operation in the clockwise direction and the rotation instruction operation in the counterclockwise direction. Accordingly, even when the user M performs the rotation instruction operation in either the clockwise direction or the clockwise direction (right hand or left hand), the rotation guidance image based on the stored position information of the rotation instruction operation can be displayed on the smartphone screen 61. Therefore, the user M can be guided to the swiping operation with less burden.

<Modification of Movement Instruction Control>

Next, modifications of the movement instruction control of the vehicle 10 performed by the processor 81 of the smartphone 60 will be described with reference to FIGS. 20 to 23.

<First Modification>

Figure 20:
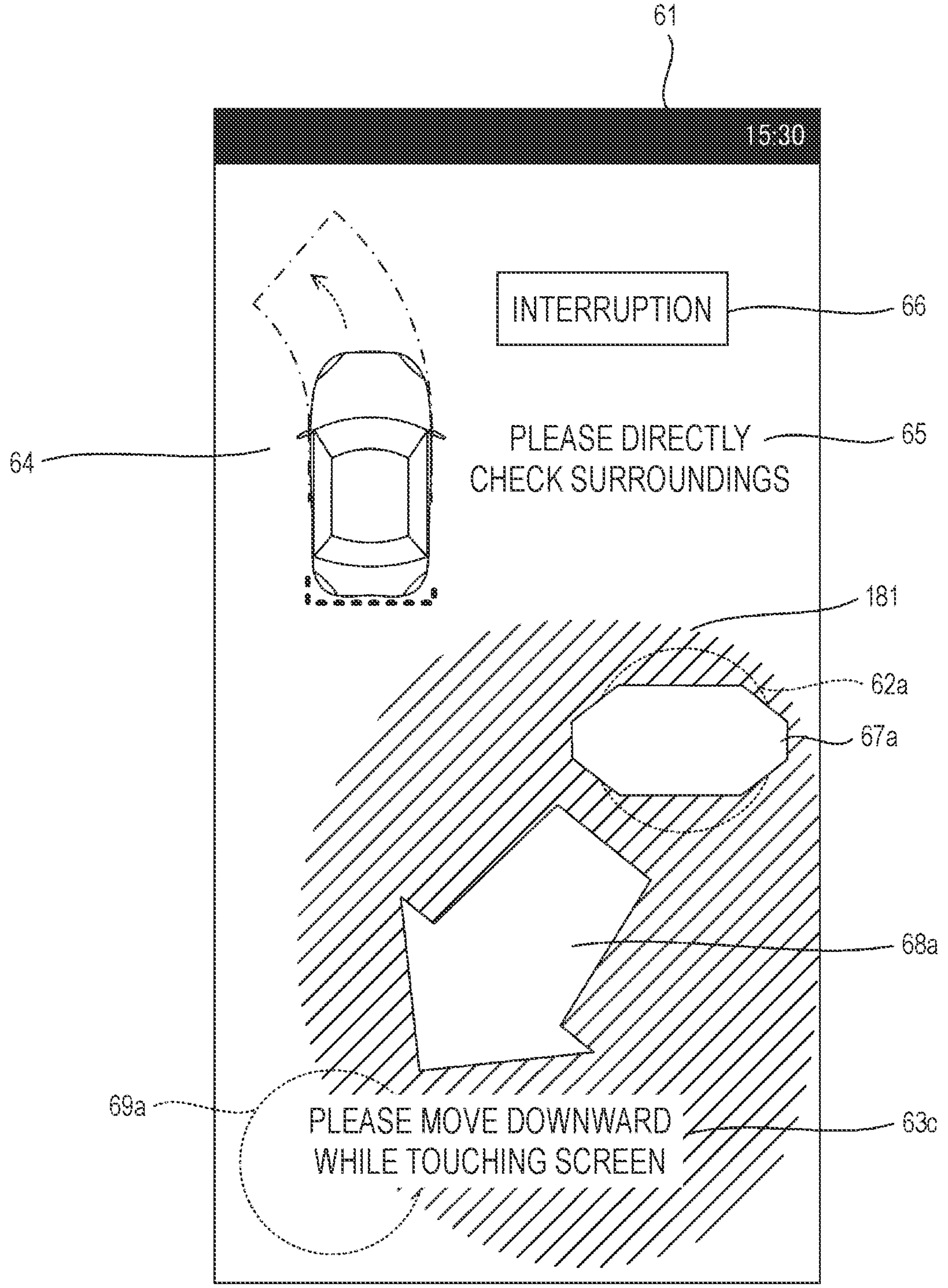
FIG. 20 is a diagram showing an example of an image displayed on the smartphone in a first modification of movement instruction control.

FIG. 20 is a diagram showing the third guidance image displayed on the smartphone screen 61 of the smartphone 60 in a first modification of the movement instruction control. The image in FIG. 20 corresponds to the images in FIGS. 10 and 15 in the above embodiment. As shown in FIG. 20, when the first position 62*a* on the right side of the first guidance image 62 is touched by the user M, the processor 81 displays the third guidance image 68*a* directed from the second guidance image 67*a* displayed at the first position 62*a* to the second position 69*a*, and superimposes on the guidance image and displays an operation range image 181 indicating a range where the user M performs the specific operation. The specific operation includes the swiping operation and the rotation swiping operation as described above.

In the example shown in the drawing, the operation range image 181 is displayed as an image with a shaded area surrounding the second guidance image 67*a* and the third guidance image 68*a*. The operation range image 181 is an image showing the range where the specific operation is performed during the previous autonomous exit. Therefore, for example, when the user M performs the specific operation in the range on the right side of the position of the guidance image displayed on the smartphone screen 61 during the previous autonomous exit, the operation range image 181 is displayed on the right side position of the smartphone screen 61. In this regard, when the user M performs the specific operation in the range on the left side of the position of the guidance image displayed on the smartphone screen 61 during the previous autonomous exit, the operation range image 181 is displayed on the left side position of the smartphone screen 61. The example shown in the drawing shows a state where the operation range image 181 is displayed at the right side position.

Accordingly, according to the processor 81 of the first modification, when the position information is stored at the time of waiting for reception of the specific operation, the smartphone screen 61 is caused to display the guidance image that prompts the specific operation and on which an image that indicates the range where the specific operation is performed is superimposed. Accordingly, the specific operation can be performed according to the guidance image that instructs the operation range, and thus, the user M can be guided to an operation with less burden, and the usability is improved.

<Second Modification>

Figure 21:
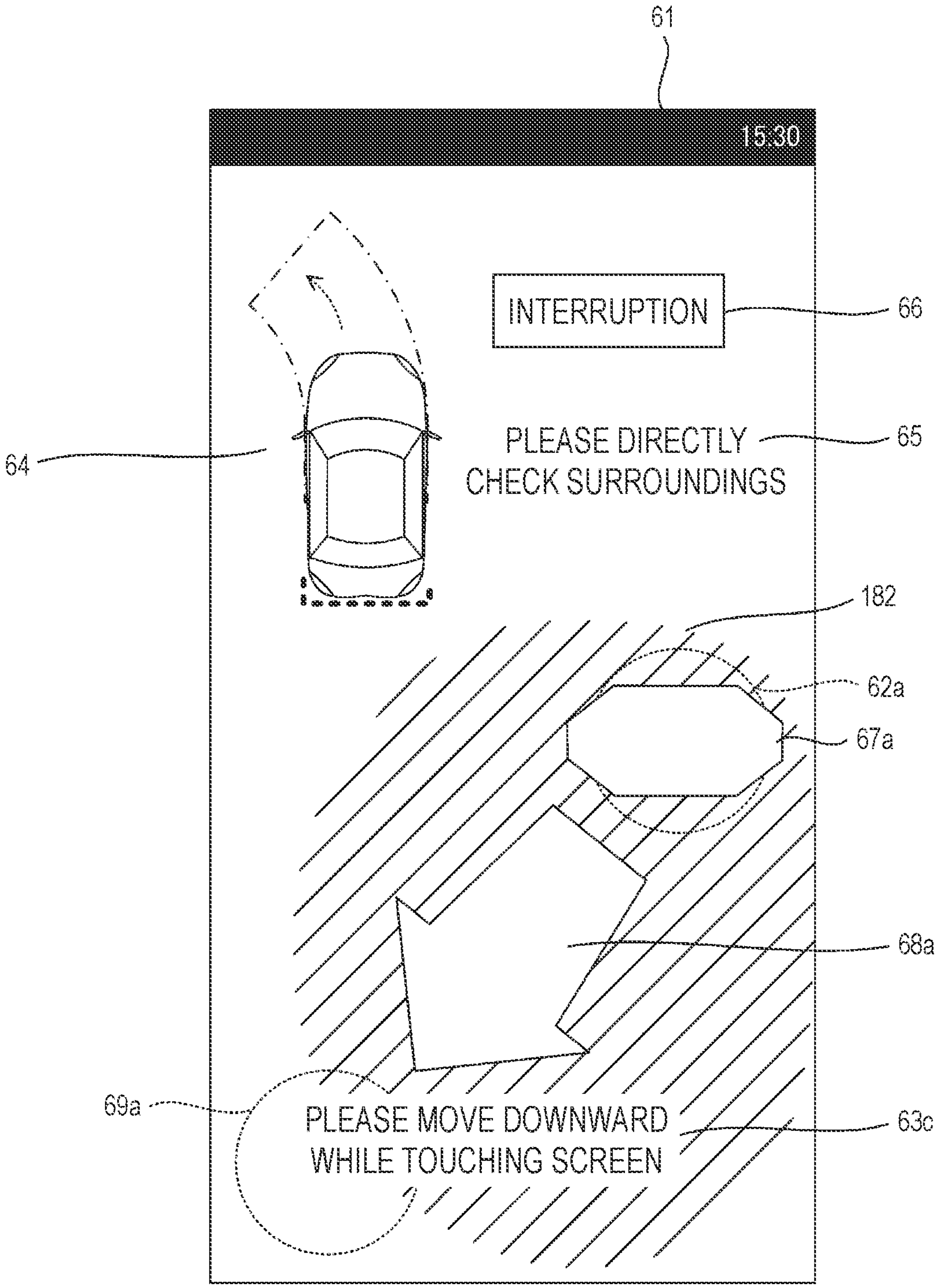
FIG. 21 is a diagram showing an example of an image displayed on the smartphone in a second modification of the movement instruction control.

FIG. 21 is a diagram showing the third guidance image 68*a* and an operation range image 182 displayed on the smartphone screen 61 of the smartphone 60 in a second modification of the movement instruction control. As shown in FIG. 21, the processor 81 displays the operation range image 182 superimposed on the third guidance image 68*a* by changing a display state according to the number of times of receptions of the specific operation. Specifically, the user M performs the specific operation in the range on the right side of the position of the guidance image displayed on the smartphone screen 61, and the processor 81 lightly displays the operation range image 182 when the number of times of the specific operations on the right side exceeds a constant value. The display of the operation range image 182 may be hidden when the number of times of receptions exceeds a predetermined number. Accordingly, the operation range image can be prevented from being conspicuously displayed even though the operation range image that indicates the range where the user performs the specific operation in the past is unnecessary.

<Third Modification>

Figure 22:
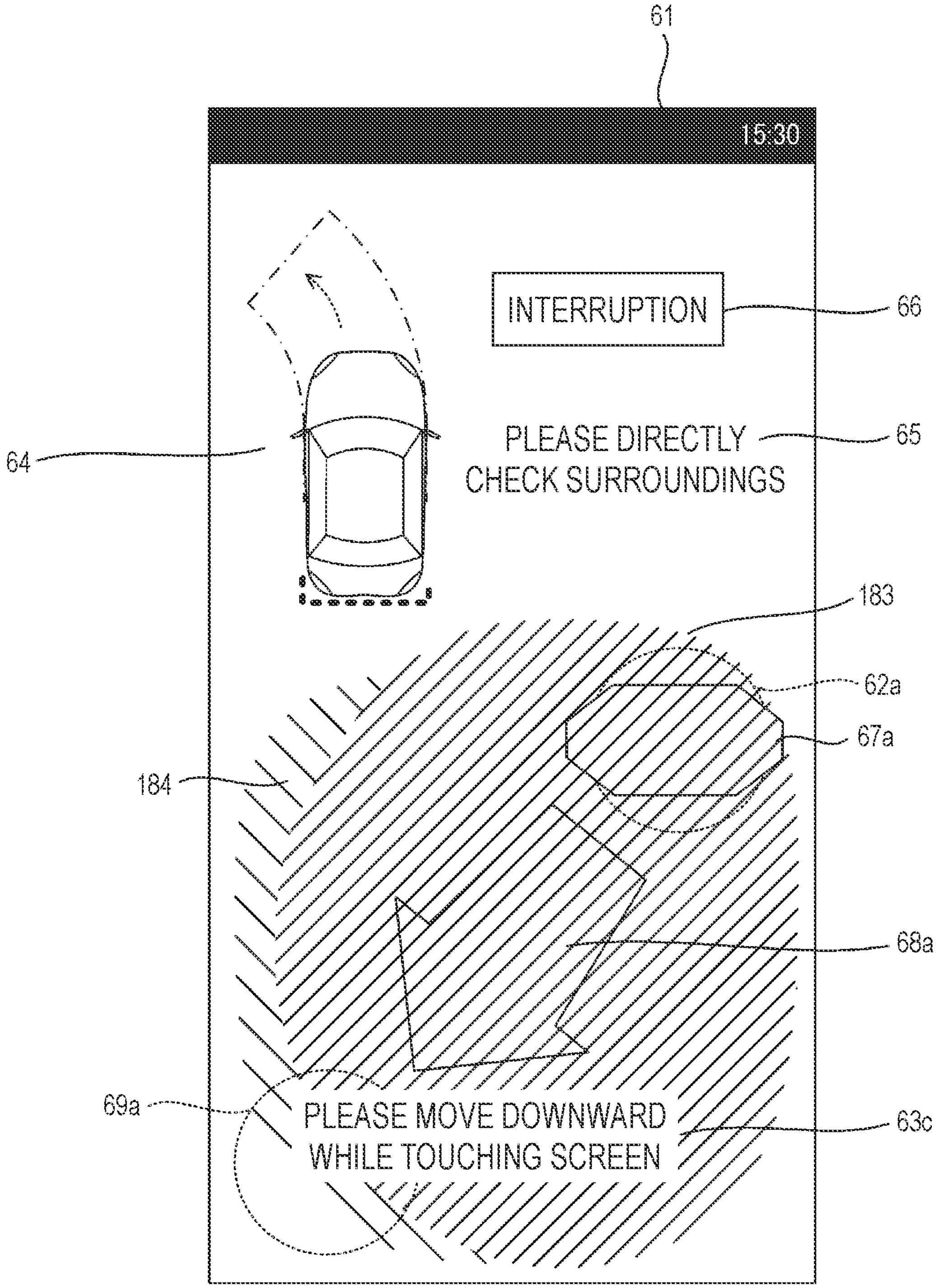
FIG. 22 is a diagram showing an example of an image displayed on the smartphone in a third modification of the movement instruction control.

FIG. 22 is a diagram showing the third guidance image 68*a* and operation range images 183 and 184 displayed on the smartphone screen 61 of the smartphone 60 in a third modification of the movement instruction control. As shown in FIG. 22, the processor 81 changes a display mode of the operation range images 183 and 184 superimposed on the third guidance image 68*a* and displayed according to the number of times of reception of the specific operation (before and after reception). Specifically, the processor 81 displays the range where the specific operation is performed during the previous-time autonomous exit with the dark operation range image 183, displays, with the light operation range image 184, the range where the specific operation is performed during the second previous-time autonomous exit, and hides the operation range image of the range where the specific operation is performed during third-time or more previous-time autonomous exit. Accordingly, a tendency of the specific operation of the user M can be reflected and the operation range image can be displayed, and thus, the usability is improved. The display mode may be displayed according to, for example, a level of a display transparency of the image, in addition to the dark and light display.

<Fourth Modification>

Figure 23:
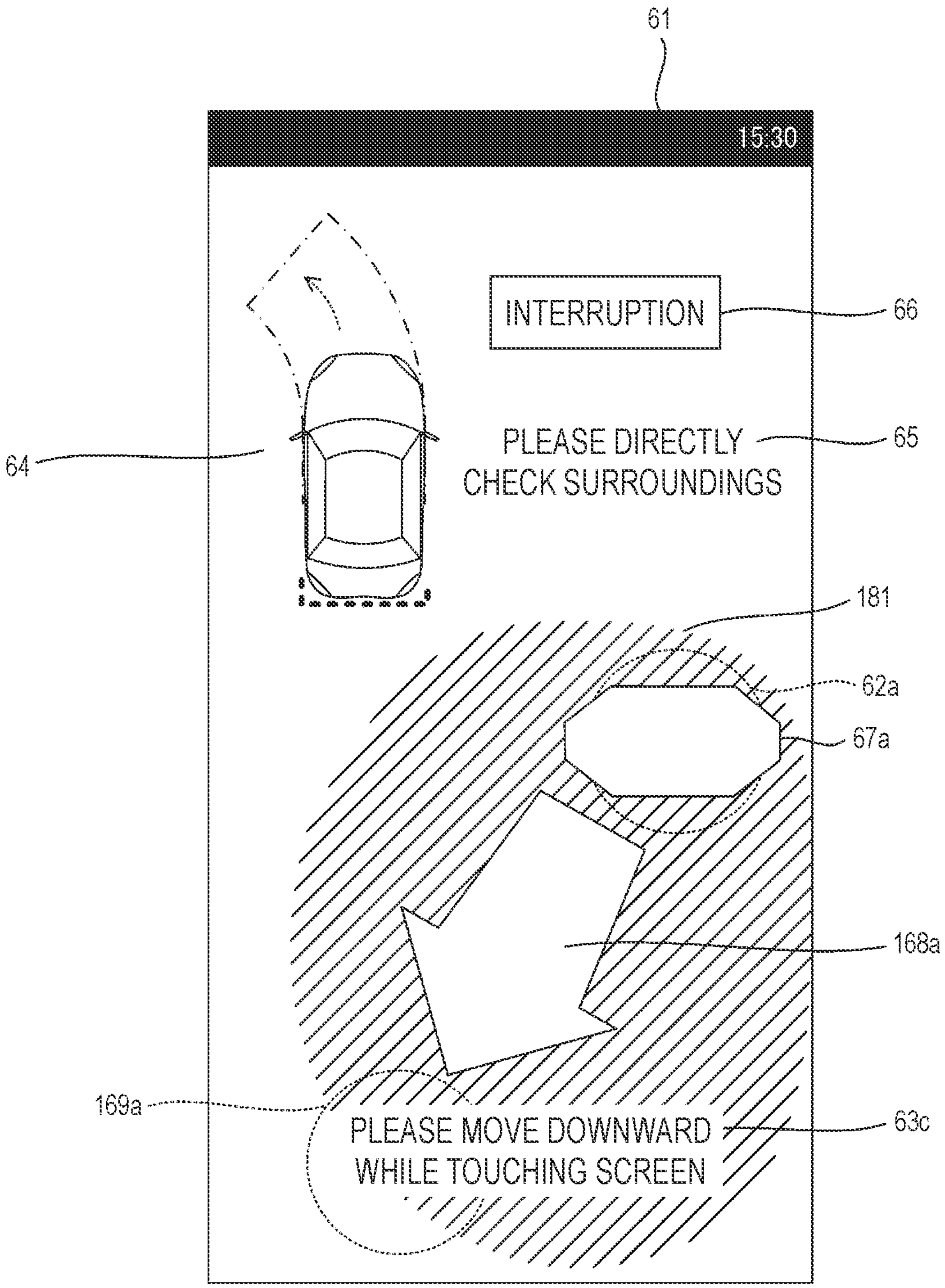
FIG. 23 is a diagram showing an example of an image displayed on the smartphone in a fourth modification of the movement instruction control.

FIG. 23 is a diagram showing the third guidance image 168*a* and the operation range image 181 displayed on the smartphone screen 61 of the smartphone 60 in a fourth modification of the movement instruction control. The image in FIG. 23 is an image obtained by combining the third guidance image 168*a* in FIG. 15 in the above embodiment and the operation range image 181 in FIG. 20 in the first modification. As shown in FIG. 23, the processor 81 displays the third guidance image 168*a* directed toward the second position 169*a* on the right side, and superimposes and displays the operation range image 181 on the right side which indicates the range where the user M performs the specific operation previous time. Accordingly, by displaying the combination of the guidance image and the operation range image, the user M can be guided to an operation with less burden, and the usability is improved.

Although the cases where the operation range image is superimposed on the third guidance image has been described in the first to fourth modifications, the present invention is not limited thereto. For example, the operation range image may be superimposed on the fourth guidance image in FIG. 12, the fifth guidance image in FIG. 13, and the instruction icon in FIG. 14.

Figure 24:
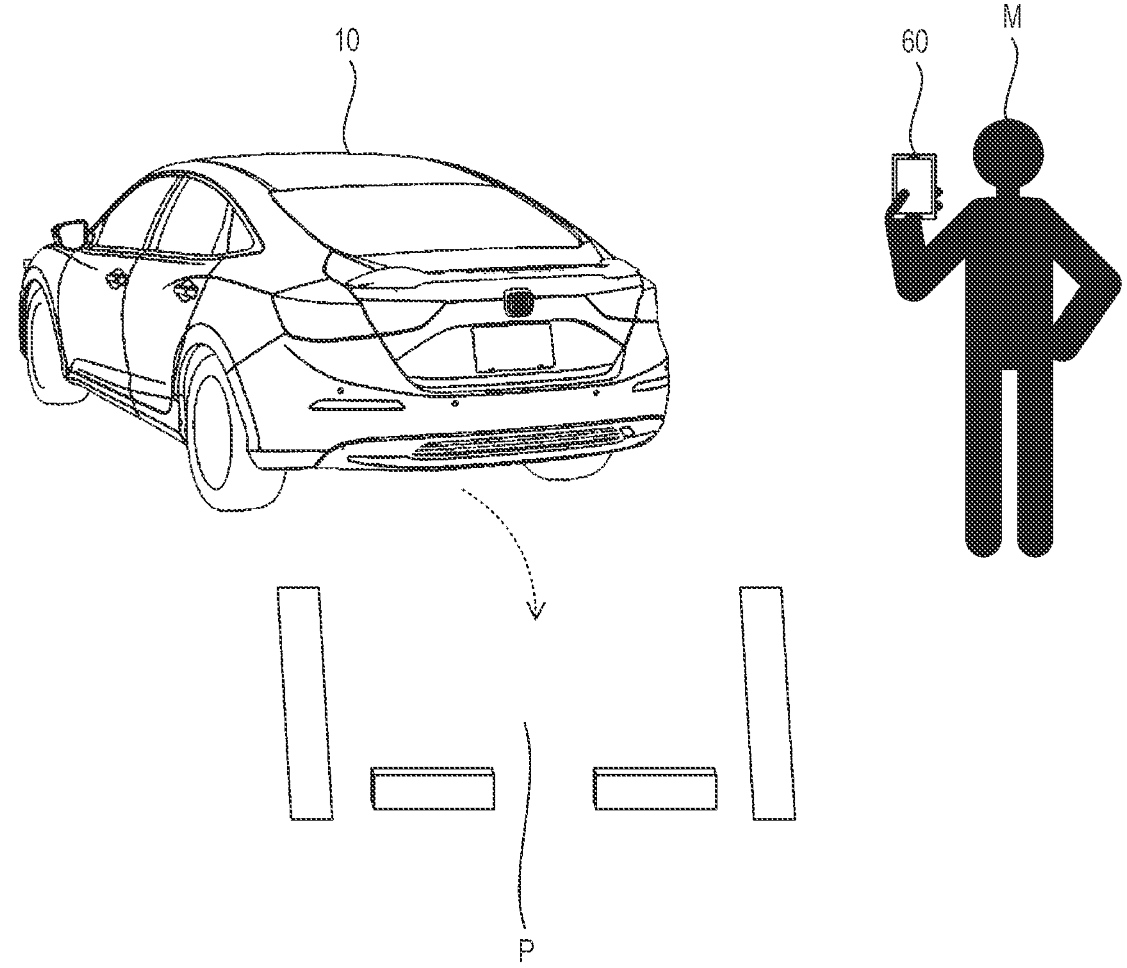
FIG. 24 is a diagram showing a state where parking instruction control of the vehicle is performed by using the smartphone from the outside of the vehicle.

In the movement instruction control performed by the above processor 81, the autonomous exit of the vehicle 10 has been described, but the movement instruction control can also be applied to the autonomous parking of the vehicle 10, for example. FIG. 24 is a diagram showing a situation where the user M of the vehicle 10 issues a parking instruction to autonomously park the vehicle 10 in the parking space P from the outside of the vehicle 10 by using the smartphone 60 carried by the user M.

Figure 25:
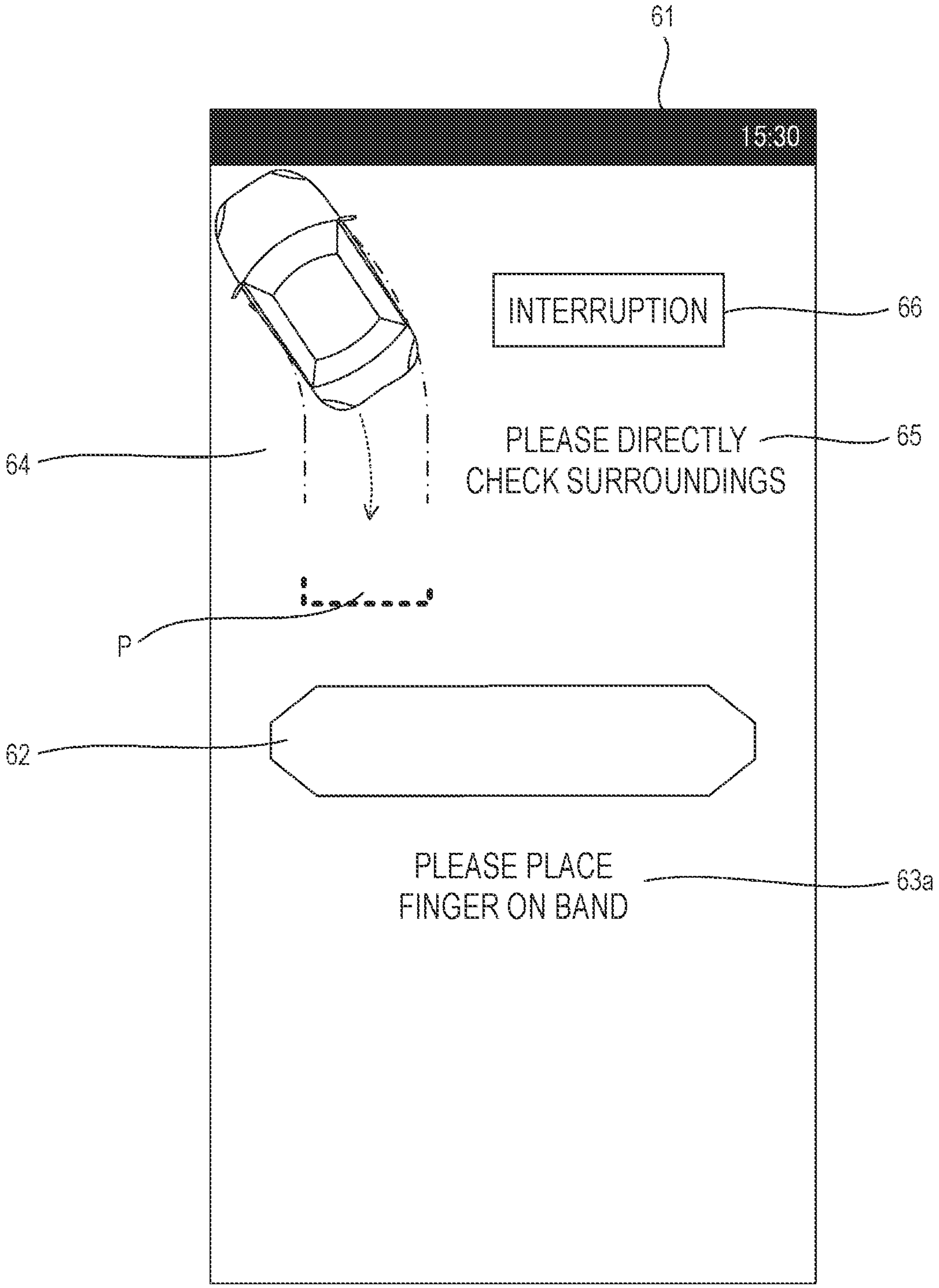
FIG. 25 is a diagram showing an example of an image displayed on the smartphone that performs the parking instruction control on the vehicle.

FIG. 25 shows an example of an image including the first guidance image displayed on the smartphone screen 61 when the processing of the exit instruction control shown in FIGS. 6 and 7 is applied to the parking instruction control, and an instruction to start the autonomous parking is received in steps S11 and S12. As shown in FIG. 25, the smartphone screen 61 displays the first guidance image 62 touch-operated by the user M, and also displays the vehicle 10 stopped in front of the parking space P and waiting for the autonomous parking control.

Although the embodiment of the present invention has been described above, the present invention is not limited to the above embodiment, and modifications, improvements, and the like can be made as appropriate.

For example, in the above-described embodiment, an example in which the moving object is a vehicle (four-wheeled automobile) has been described, but the present invention is not limited thereto. For example, the moving object may be a two-wheeled vehicle or a Segway. Further, the concept of the present invention can be applied not only to a vehicle but also to a robot, a ship, an aircraft, or the like that is provided with a drive source and is movable according to power of the drive source.

The control method described in the above embodiment can be implemented by executing a control program prepared in advance on a computer. The control program is recorded in a computer-readable storage medium and is executed by being read from the storage medium. In addition, the control program may be provided in a form of being stored in a non-transitory storage medium such as a flash memory, or may be provided via a network such as the Internet. The computer that executes the control program may be provided in a control device, may be provided in an electronic device such as a smartphone, a tablet terminal, or a personal computer capable of communicating with the control device, or may be provided in a server device capable of communicating with the control device and the electronic device.

In addition, at least the following matters are described in the present specification. Although the corresponding components or the like in the above embodiment are illustrated in parentheses, the present invention is not limited thereto.

(1) A portable information terminal (smartphone 60) for a user (user M) of a moving object (vehicle 10), the information terminal including:

a display (smartphone screen 61) configured to perform a position instruction operation on a display image; and a controller (processor 81) configured to perform movement control of the moving object based on a specific operation of the user on the display, in which the controller is configured to:

cause the display to display a guidance image that prompts the specific operation when waiting for receiving the specific operation, store position information of the specific operation performed by the user based on the guidance image, and display the guidance image that prompts the specific operation based on the position information on the display in a case of storing the position information when waiting for receiving the specific operation.

According to (1), the guidance image is displayed based on the position of the operation performed by the user in the past and accepted as the specific operation, so that an operation with less burden for the user can be guided, and usability is improved.

(2) The information terminal according to (1), in which if the controller stores the position information when waiting for receiving the specific operation, the controller displays the guidance image that prompts the specific operation and indicates a position based on the position information on the display.

According to (2), the guidance image that indicates the position where the specific operation is performed is displayed, so that an operation with less burden for the user can be guided, and the usability is improved.

(3) The information terminal according to (1) or (2), in which the position information indicates a range where the user performs the specific operation on the display, and if the controller stores the position information w % ben waiting for receiving the specific operation, the controller causes the display to display the guidance image that prompts the specific operation and on which an image that indicates the range is superimposed.

According to (3), the guidance image that indicates the range where the specific operation is performed is displayed, so that an operation with less burden for the user can be guided, and the usability is improved.

(4) The information terminal according to (3), in which if the controller stores the position information when waiting for receiving the specific operation, the controller changes the image that indicates the range based on a history of receiving the specific operation from the user.

According to (4), a guidance image that is highly effective for the user can be displayed.

(5) The information terminal according to any one of (1) to (4), in which the specific operation includes a rotation instruction operation, the guidance image includes a rotation guidance image that prompts the rotation instruction operation, and the controller stores the position information for each of the rotation instruction operation in a clockwise direction and the rotation instruction operation in a counterclockwise direction.

According to (5), even when the user M performs the rotation instruction operation in either the clockwise direction or the counterclockwise direction (right hand or left hand), the rotation guidance image based on the stored position information of the rotation instruction operation can be displayed, and an operation with less burden for the user can be guided, and thus usability is improved.

(6) A control method performed by a controller of a portable information terminal for a user of a moving object, the information terminal including: a display configured to perform a position instruction operation on a display image; and the controller configured to perform movement control of the moving object based on a specific operation of the user on the display, in which the control method includes:

cause the display to display a guidance image that prompts the specific operation when waiting for receiving the specific operation, store position information of the specific operation performed by the user based on the guidance image, and display the guidance image that prompts the specific operation based on the position information on the display in a case of storing the position information when waiting for receiving the specific operation.

According to (6), the guidance image is displayed based on the position of the operation performed by the user in the past and accepted as the specific operation, so that an operation with less burden for the user can be guided, and the usability is improved.

(7) A non-transitory computer-readable recording medium storing a control program for causing a controller of a portable information terminal for a user of a moving object to execute processing, the information terminal including: a display configured to perform a position instruction operation on a display image; and the controller configured to perform movement control of the moving object based on a specific operation of the user on the display, in which the processing includes:

causing the display to display a guidance image that prompts the specific operation when waiting for receiving the specific operation, storing position information of the specific operation performed by the user based on the guidance image, and displaying the guidance image that prompts the specific operation based on the position information on the display in a case of storing the position information when waiting for receiving the specific operation.

According to (7), the guidance image is displayed based on the position of the operation performed by the user in the past and accepted as the specific operation, so that an operation with less burden for the user can be guided and usability is improved.

The invention claimed is:

1. A portable information terminal for a user of a moving object, the information terminal comprising:

a display configured to perform a position instruction operation on a display image; and a controller configured to perform movement control of the moving object based on a specific operation from the user on the display, wherein the controller is configured to cause the display to display a guidance image that prompts the specific operation in a state in which the specific operation is not performed, store position information that indicates a range where the user performs the specific operation on the display based on the guidance image, and cause the display to display the guidance image that prompts another specific operation and on which an image that indicates the range is superimposed, in a state in which the another specific operation is not performed after the specific operation is performed.

2. The information terminal according to claim 1, wherein in the state in which the another specific operation is not performed, the controller changes the image that indicates the range based on a history of receiving the specific operation from the user.

3. The information terminal according to claim 1, wherein the specific operation and the another specific operation include a rotation instruction operation, the guidance image includes a rotation guidance image that prompts the rotation instruction operation, and the controller stores the position information for each of the rotation instruction operation in a clockwise direction and the rotation instruction operation in a counterclockwise direction.

4. A control method performed by a controller of a portable information terminal for a user of a moving object, wherein the information terminal includes a display configured to perform a position instruction operation on a display image the controller configured to perform movement control of the moving object based on a specific operation from the user on the display, and the control method comprises:

causing the display to display a guidance image that prompts the specific operation in a state in which the specific operation is not performed, storing position information that indicates a range where the user performs the specific operation on the display based on the guidance image, and causing the display to display the guidance image that prompts another specific operation and on which an image that indicates the range is superimposed, in a state in which the another specific operation is not performed after the specific operation is performed.

5. A non-transitory computer-readable recording medium storing a control program for causing a controller of a portable information terminal for a user of a moving object to execute processing, wherein the information terminal includes a display configured to perform a position instruction operation on a display image and the controller configured to perform movement control of the moving object based on a specific operation from the user on the display, the processing comprises:

causing the display to display a guidance image that prompts the specific operation in a state in which the specific operation is not performed, storing position information that indicates a range where the user performs the specific operation on the display based on the guidance image, and causing the display to display the guidance image that prompts the specific operation and on which an image that indicates the range is superimposed, in a state in which the another specific operation is not performed after the specific operation is performed.

* * * * *